United States Patent
Akanuma et al.

(10) Patent No.: US 12,421,409 B2
(45) Date of Patent: Sep. 23, 2025

(54) INK SET FOR TEXTILE PRINTING AND METHOD OF TEXTILE PRINTING ON FIBER

(71) Applicant: NIPPON KAYAKU KABUSHIKI KAISHA, Tokyo (JP)

(72) Inventors: Rima Akanuma, Tokyo (JP); Makoto Teranishi, Tokyo (JP); Takashi Yoneda, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 1046 days.

(21) Appl. No.: 17/593,093

(22) PCT Filed: Mar. 3, 2020

(86) PCT No.: PCT/JP2020/008942
§ 371 (c)(1),
(2) Date: Sep. 9, 2021

(87) PCT Pub. No.: WO2020/184302
PCT Pub. Date: Sep. 17, 2020

(65) Prior Publication Data
US 2022/0154397 A1  May 19, 2022

(30) Foreign Application Priority Data
Mar. 11, 2019 (JP) .................. 2019-043937

(51) Int. Cl.
*C09D 11/40* (2014.01)
*C09D 11/02* (2014.01)
(Continued)

(52) U.S. Cl.
CPC .............. *C09D 11/40* (2013.01); *C09D 11/02* (2013.01); *C09D 11/30* (2013.01); *C09D 11/322* (2013.01); *D06P 5/30* (2013.01)

(58) Field of Classification Search
CPC .... D06P 5/30; D06P 5/006; D06P 3/54; D06P 1/20; C09D 11/02; C09D 11/30;
(Continued)

(56) References Cited

U.S. PATENT DOCUMENTS 5,382,561 A * 1/1995 Mori ................... B41M 5/345
503/227

FOREIGN PATENT DOCUMENTS

| JP | S63246287 A | 10/1988 |
|----|-------------|---------|
| JP | 2000239980 A * | 9/2000 |

(Continued)

OTHER PUBLICATIONS

Nov. 8, 2022, the Extended European Search Report issued by the European Patent Office in the corresponding European Patent Application No. 20769120.5.
(Continued)

*Primary Examiner* — Sophie Hon
*Assistant Examiner* — Sow-Fun Hon
(74) *Attorney, Agent, or Firm* — KENJA IP LAW PC

(57) ABSTRACT

Provided is an ink set for textile printing giving a good reproducible color gamut. The ink set includes a cyan ink and a violet ink that each contain a water-insoluble colorant and water. The cyan ink contains at least a compound represented by formula (1) below as the water-insoluble colorant, and the violet ink contains at least one selected (Continued)

from the group consisting of C.I. Disperse Violet 27 and C.I. Disperse Violet 28 as the water-insoluble colorant,

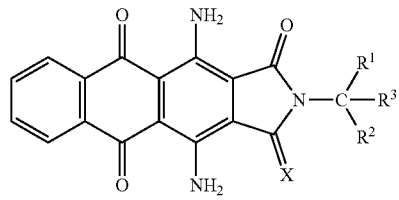

(1)

where $R^1$, $R^2$, and $R^3$ each independently represents a hydrogen atom or a C1-C4 alkyl group; at least two of $R^1$, $R^2$, and $R^3$ are C1-C4 alkyl groups; the number of carbon atoms in $R^1$, $R^2$, and $R^3$ is 4 to 12 in total; and X represents an oxygen atom or an imino group.

12 Claims, 31 Drawing Sheets

(51) Int. Cl.
 *C09D 11/30* (2014.01)
 *C09D 11/322* (2014.01)
 *D06P 5/30* (2006.01)

(58) Field of Classification Search
 CPC ..... C09D 11/322; C09D 11/328; C09D 11/40; C09D 11/54; C09B 5/62
 See application file for complete search history.

(56) References Cited

FOREIGN PATENT DOCUMENTS

| | | | |
|---|---|---|---|
| JP | 2010513633 A | 4/2010 | |
| JP | 2014080539 A | 5/2014 | |
| JP | 2015093956 A | 5/2015 | |
| JP | 2015093957 A | 5/2015 | |
| JP | 2018059046 A | 4/2018 | |
| JP | 2018178037 A | 11/2018 | |
| JP | 2018178038 A | 11/2018 | |
| JP | 2018178039 A * | 11/2018 | |
| JP | 2019001870 A | 1/2019 | |
| JP | 2019001871 A | 1/2019 | |
| JP | 7489962 B2 * | 5/2024 | ............ C09D 11/40 |

OTHER PUBLICATIONS

Aug. 25, 2021, International Preliminary Report on Patentability issued in the International Patent Application No. PCT/JP2020/008942.
Aug. 18, 2023, Office Action issued by the China National Intellectual Property Administration in the corresponding Chinese Patent Application No. 202080019088.5.
May 26, 2020, International Search Report issued in the International Patent Application No. PCT/JP2020/008942.

* cited by examiner

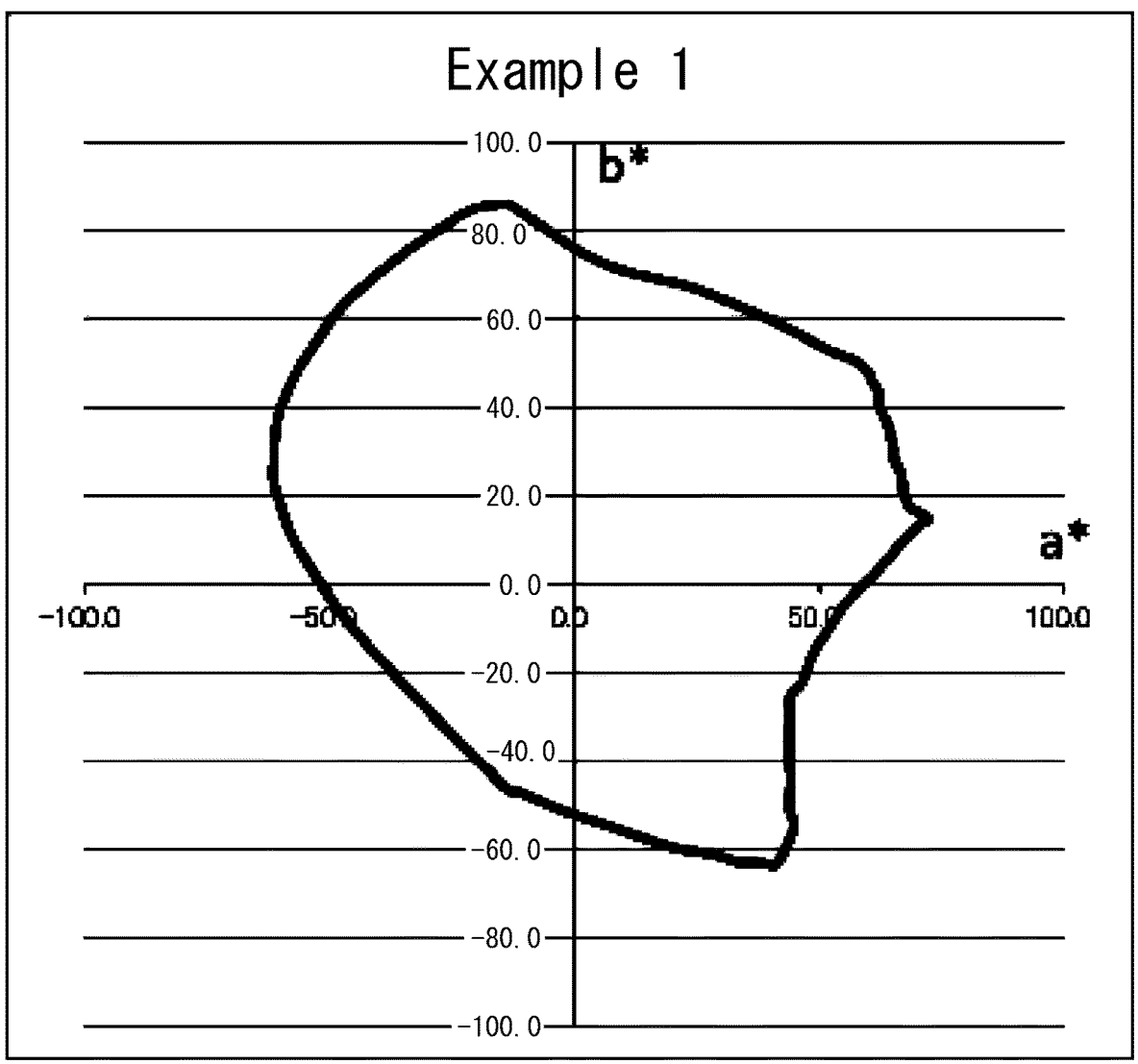

Example 7

Example 6 and Comparative Example 3

INK SET FOR TEXTILE PRINTING AND METHOD OF TEXTILE PRINTING ON FIBER

TECHNICAL FIELD

The present disclosure relates to an ink set for textile printing and a method of textile printing on fiber using the same.

BACKGROUND

In recent years, recording methods for performing inkjet printing without plate making have been proposed, and inkjet textile printing is performed even in textile printing on fiber including cloth and others. As compared with conventional textile printing methods such as screen printing, textile printing using inkjet printing is advantageous in many ways, for example, it does not include plate making, is resource saving and energy saving, and facilitates high definition representation. Hydrophobic fiber cloth such as polyester fiber is typically dyed with water-insoluble colorants. Accordingly, as a water-based ink for textile printing on hydrophobic fiber by an inkjet recording method, a dispersion ink having good properties such as high dispersion stability, in which a water-insoluble colorant is typically dispersed in water, is necessarily used.

Techniques for inkjet textile printing on hydrophobic fiber typified by polyester fiber fall roughly into the following two methods. One of them is a direct printing technique in which an ink is directly applied to fiber (by printing), followed by heat treatment such as high-temperature steaming to perform dyeing of the fiber with a dye in the ink, and the other is a sublimation transfer technique in which an ink is applied (by printing) to an intermediate recording medium (such as dedicated transfer paper), and then a surface of the intermediate recording medium to which the ink is applied is brought into contact with hydrophobic fiber, followed by transferring of a dye by heat from the intermediate recording medium to the fiber side.

The above sublimation transfer technique is mainly used for a textile printing process for banners, sportswear, etc., and a dye that can be easily sublimed and exhibits excellent transfer properties when being transferred onto polyester by heat treatment is used in an ink. The process steps chiefly include two steps: (1) a printing step of applying a dye ink to an intermediate recording medium; and (2) a transferring step of transferring a dye from an intermediate recording medium into fiber by heat treatment to perform dyeing. The process can use a wide variety of commercially available transfer paper, so that pretreatments on fiber are not required, and a cleaning step is also omitted.

The properties required of a water-insoluble colorant used in the above sublimation transfer technique include good sublimability, good coloring on hydrophobic fiber, and excellent fastnesses. Accordingly, coloring matters widely used in the market are limited and ones available from the manufactures have a similar reproducible color gamut.

CITATION LIST

Patent Literature

PTL 1: JP 2019-001871 A
PTL 2: JP 2019-178038 A
PTL 3: JP 2019-001870 A
PTL 4: JP 2019-178039 A
PTL 5: JP 2014-080539 A

SUMMARY

Technical Problem

It could be helpful to provide an ink set for textile printing that makes it possible to achieve a good reproducible color gamut and a method of textile printing on fiber using the same.

Solution to Problem

The inventors of the present disclosure found that an ink set includes a cyan ink and a violet ink that each contain a water-insoluble colorant and water, in which the cyan ink contains at least a compound represented by the following formula (1) as the water-insoluble colorant, and the violet ink contains at least one selected from the group consisting of C.I. Disperse Violet 27 and C.I. Disperse Violet 28 as the water-insoluble colorant can solve the above problems.

The present disclosure specifically relates to 1) to 15) below.

1) An ink set comprising a cyan ink and a violet ink that each contain a water-insoluble colorant and water, wherein the cyan ink contains at least a compound represented by formula (1) as the water-insoluble colorant, and the violet ink contains at least one selected from the group consisting of C.I. Disperse Violet 27 and C.I. Disperse Violet 28 as the water-insoluble colorant,

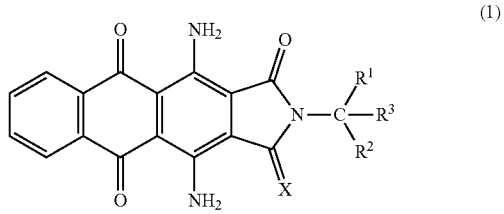

where $R^1$, $R^2$, and $R^3$ each independently represents one of a hydrogen atom and a C1-C4 alkyl group; at least two of $R^1$, $R^2$, and $R^3$ are C1-C4 alkyl groups; a number of carbon atoms in $R^1$, $R^2$, and $R^3$ is 4 to 12 in total; and X represents one of an oxygen atom and an imino group.

2) The ink set according to 1) above, further comprising at least one yellow ink.
3) The ink set according to 2) above, wherein the yellow ink contains at least C.I. Disperse Yellow 54.
4) The ink set according to any one of 1) to 3) above, further comprising at least one magenta ink.
5) The ink set according to 4) above, wherein the magenta ink contains at least C.I. Disperse Red 60.
6) The ink set according to any one of 1) to 5) above, further comprising at least one second cyan ink.
7) The ink set according to 6) above, wherein the second cyan ink contains at least C.I. Disperse Blue 359.
8) The ink set according to any one of 1) to 7) above, further comprising at least one orange ink.
9) The ink set according to 8) above, wherein the orange ink contains at least C.I. Disperse Orange 25.
10) The ink set according to any one of 1) to 9) above, wherein any two of $R^1$, $R^2$, and $R^3$ in formula (1) are C1-C4 alkyl groups, and the other one is a hydrogen atom.

11) The ink set according to any one of 1) to 10) above, wherein any two of $R^1$, $R^2$, and $R^3$ in formula (1) are ethyl groups, and the other one is a hydrogen atom.

12) A fiber on which textile printing has been performed using the ink set according to any one of 1) to 11) above.

13) A method of textile printing on a hydrophobic fiber, comprising:
a step A of applying ink droplets to the hydrophobic fiber with an inkjet printer using the ink set according to any one of 1) to 11) above;
a step B of fixing the colorant in the ink droplets applied in the step A to the fiber by heat; and
a step C of washing off part of the colorant left unfixed in the fiber.

14) A method of textile printing on a hydrophobic fiber, comprising: applying ink droplets to an intermediate recording medium with an inkjet printer using the ink set according to any one of 1) to 11) above to obtain a recorded image; and then bringing the hydrophobic fiber into contact with a surface of the intermediate recording medium to which the ink droplets have been applied, followed by heat treatment, whereby transferring the recorded image to the hydrophobic fiber.

15) The method of textile printing on a hydrophobic fiber, according to 13) or 14) above, further comprising a fiber pretreatment step of adding an aqueous solution containing at least one or more sizing agents, an alkaline substance, an anti-reducing agent, and a hydrotropic agent to the fiber to be subjected to the application of the inks.

Advantageous Effect

The ink set according to the present disclosure and the method of textile printing on fiber using the same can provide ink sets for textile printing that make it possible to achieve a good reproducible color gamut.

BRIEF DESCRIPTION OF THE DRAWINGS

In the Accompanying Drawings.

DETAILED DESCRIPTION

Figure 1:
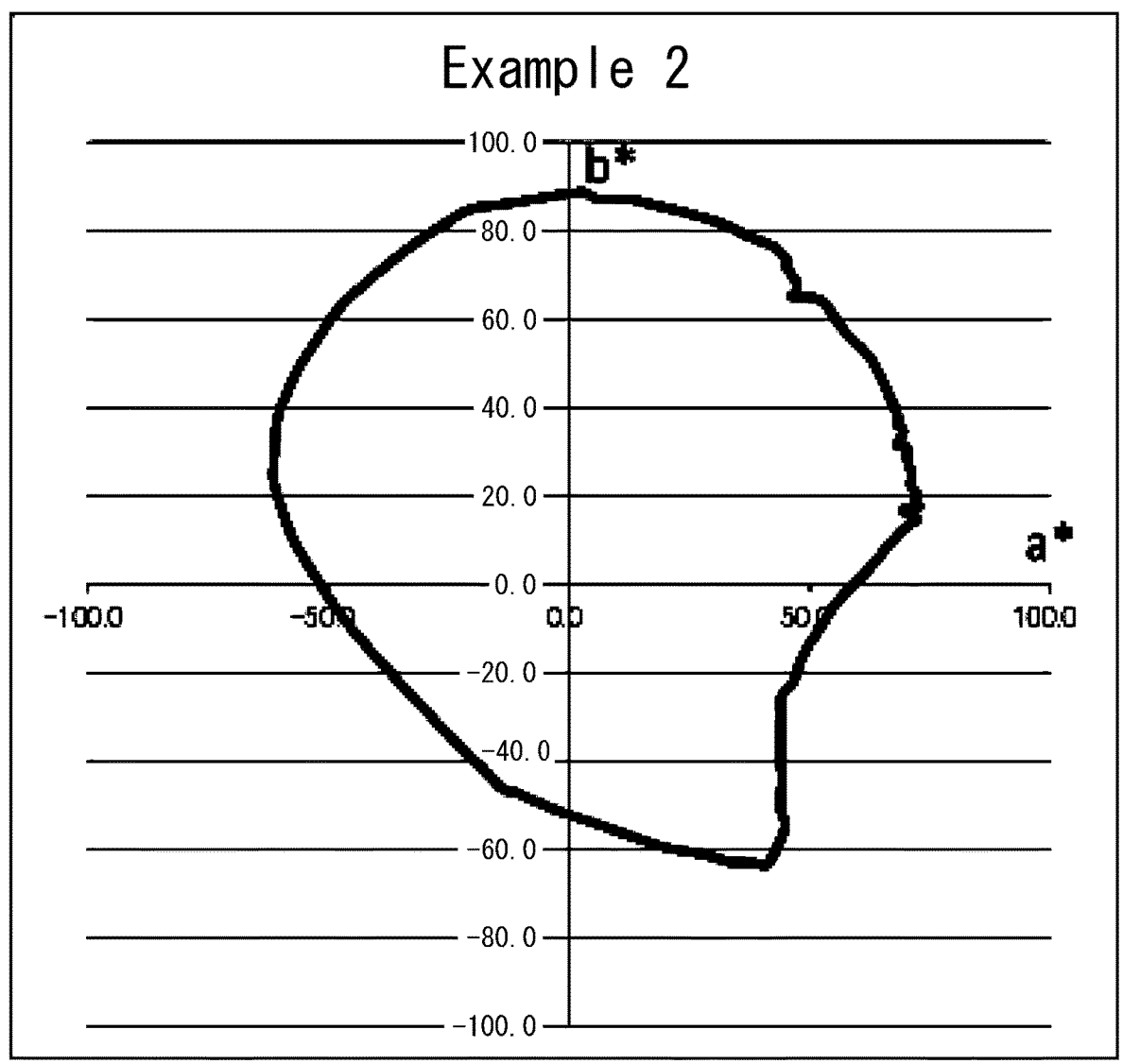
FIG. 1 shows diagrams in which a* and b* found by colorimetry on a dye transferred onto hydrophobic fiber are plotted on the XY coordinate using the patch obtained in each Example, and adjacent data points are connected.
Figure 1:
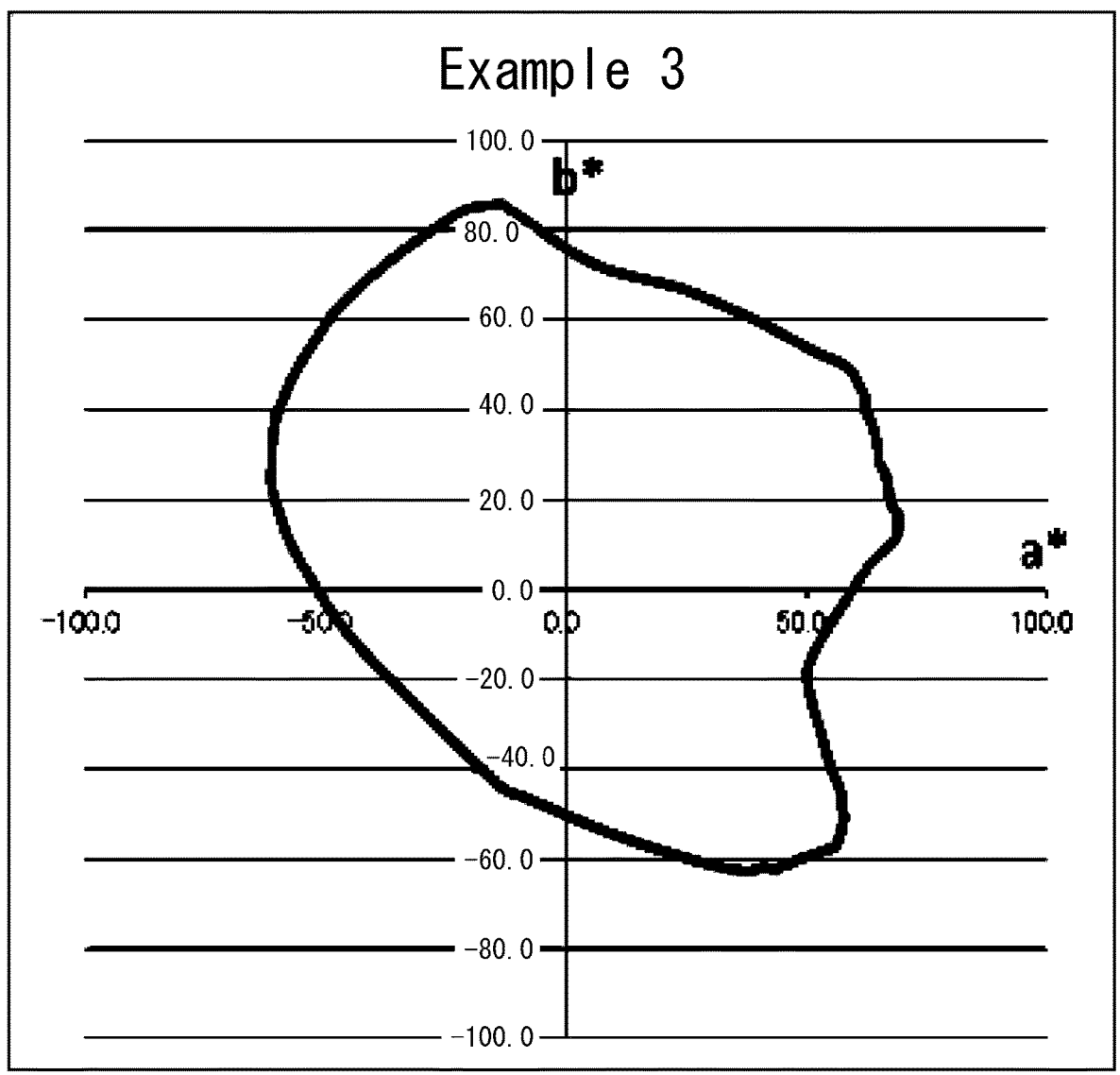
Figure 1:
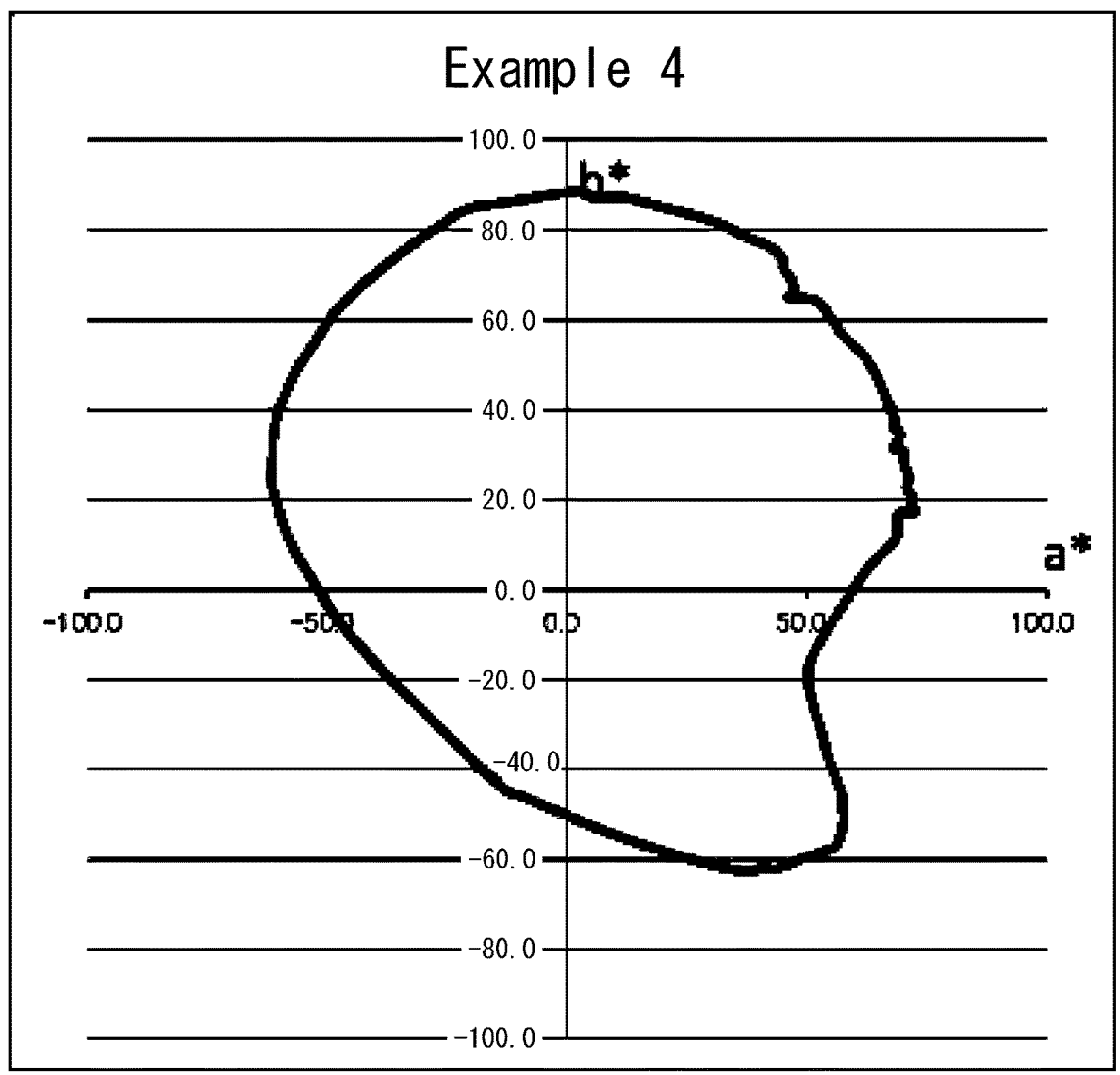
Figure 1:
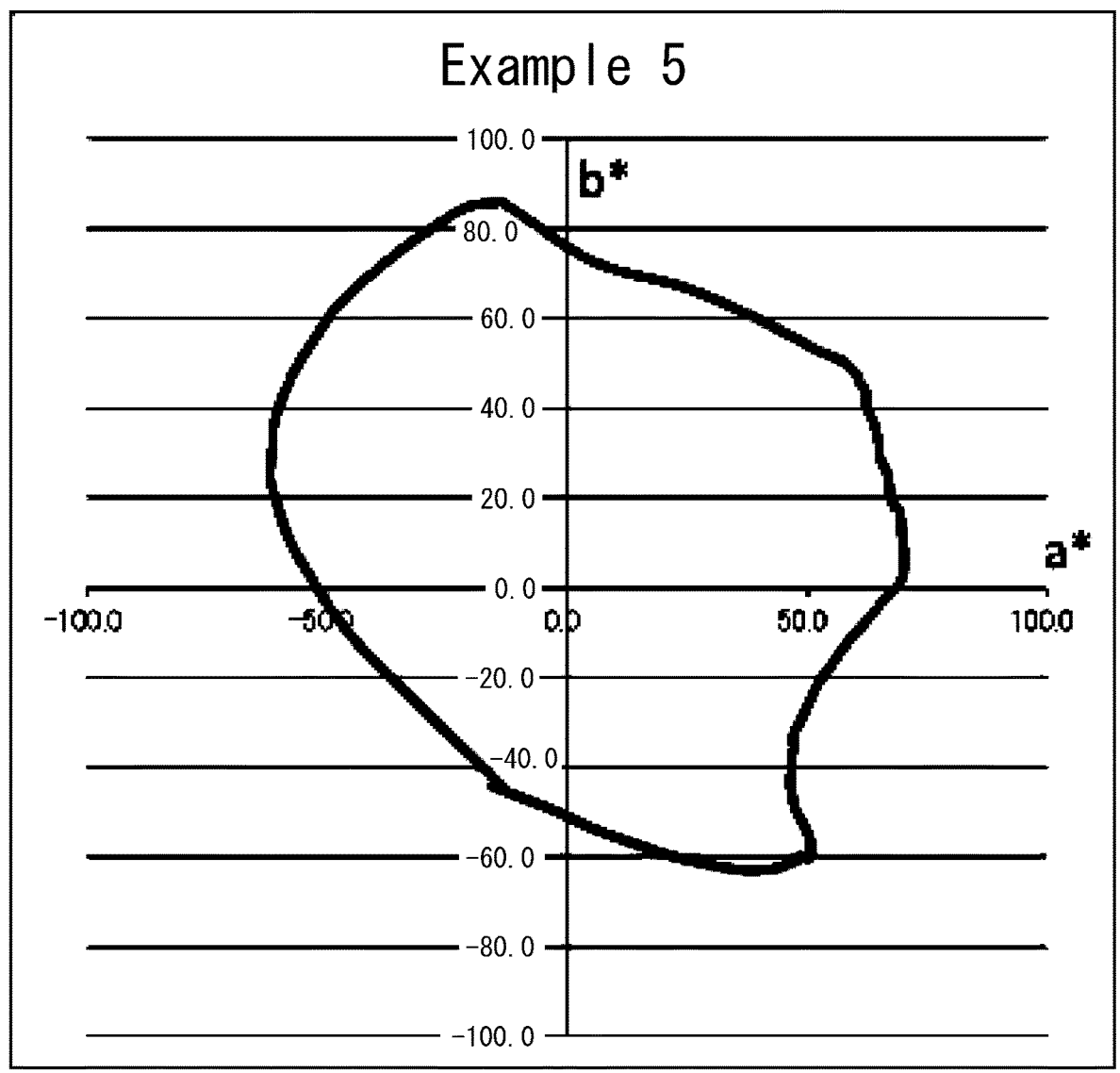
Figure 1:
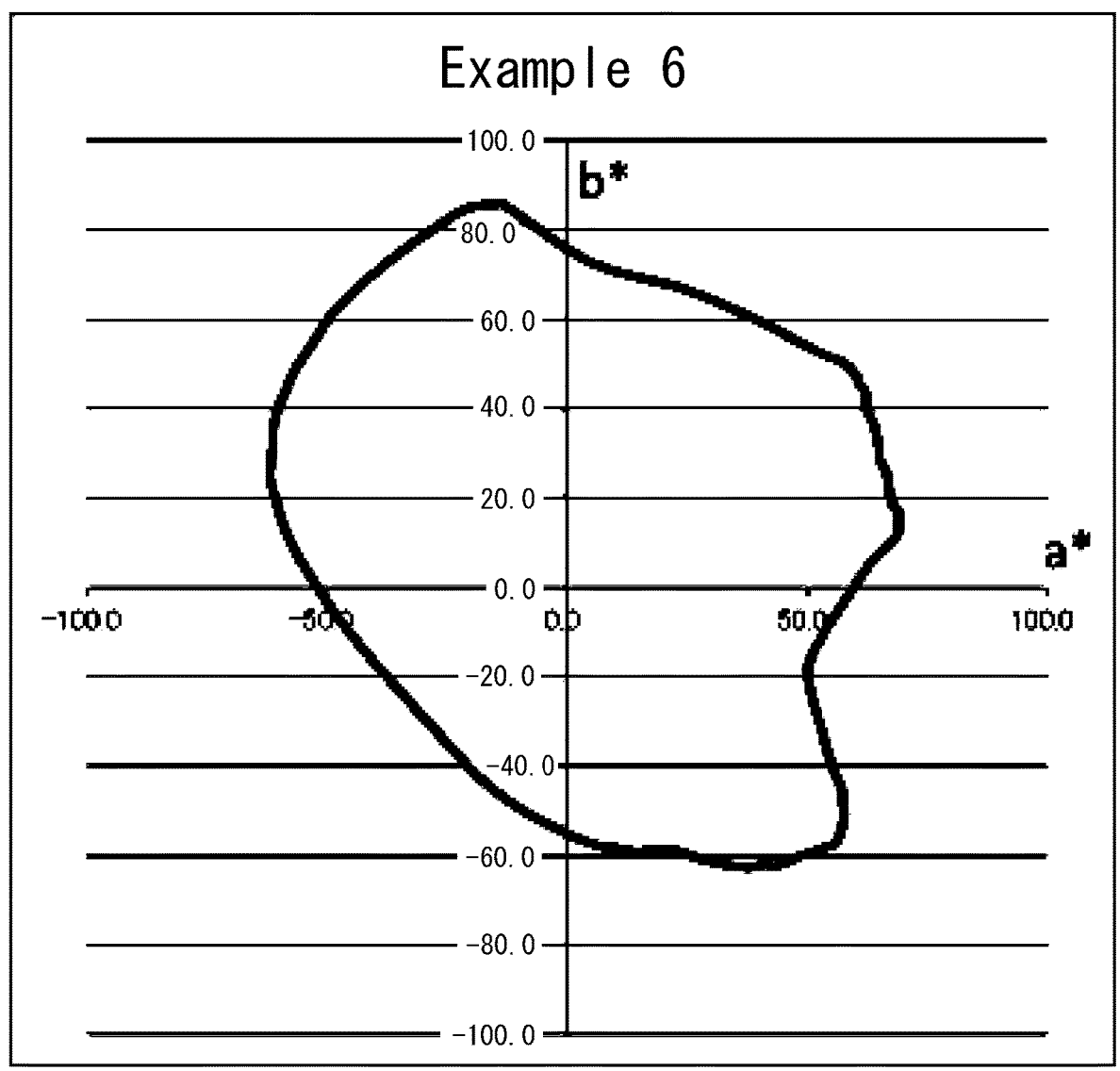
Figure 1:
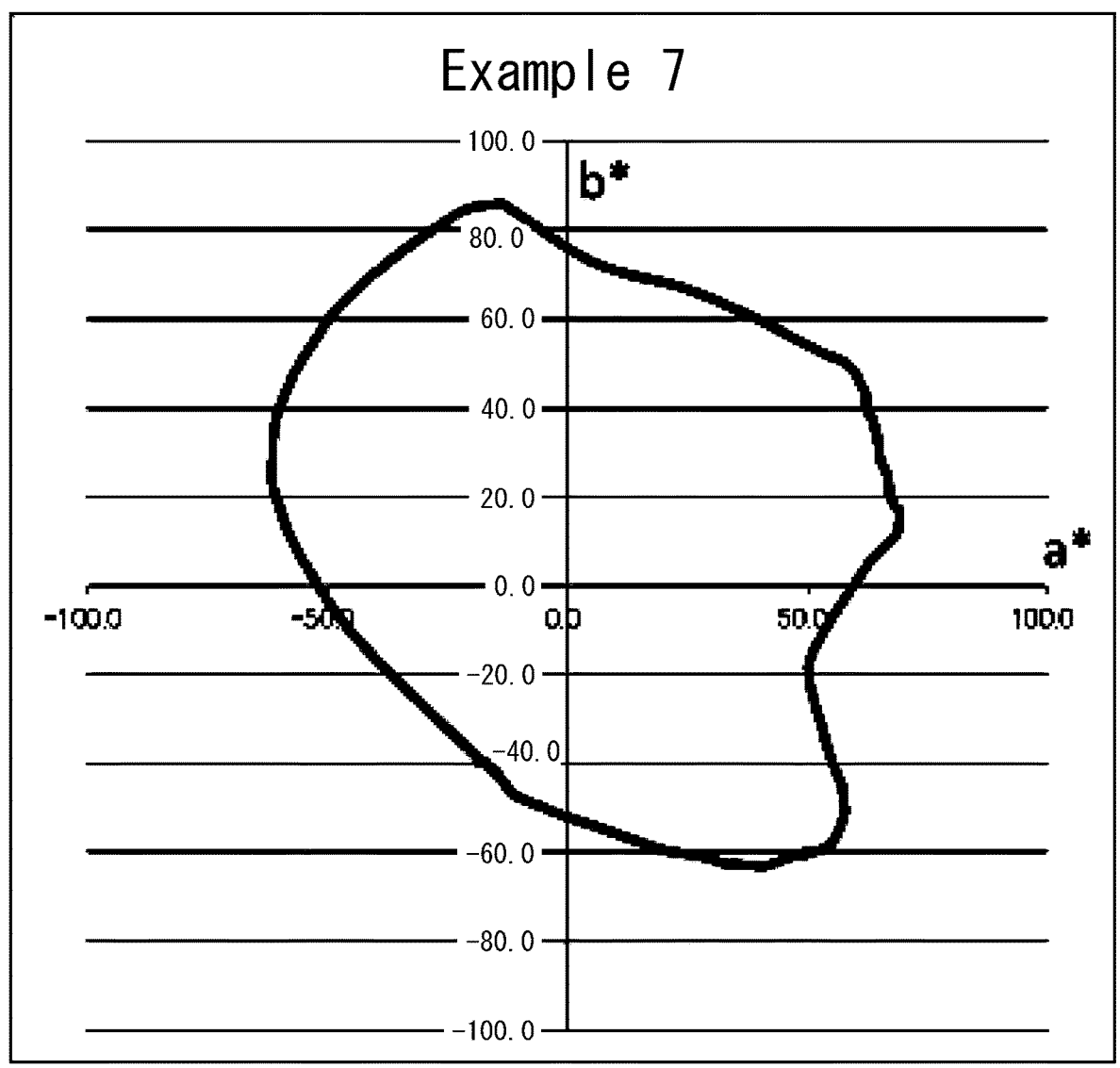

The term "C.I." herein means "color index". Unless otherwise specified, "%" and "part(s)" in any of the sections including Examples are by mass.

The present disclosure relates to an ink set including a cyan ink and a violet ink that each contain a water-insoluble colorant and water, in which the cyan ink contains at least a compound represented by formula (1) above as the water-insoluble colorant, and the violet ink contains at least one selected from the group consisting of C.I. Disperse Violet 27 and C.I. Disperse Violet 28 as the water-insoluble colorant.

Note that in each ink, the content of the water-insoluble colorant (dye) is preferably in a range of 2% by mass to 11% by mass, more preferably in the range of 3% by mass to 8% by mass.

The above cyan ink contains at least the compound represented by formula (1) above as a water-insoluble colorant. In the compound represented by formula (1) above, $R^1$, $R^2$, and $R^3$ each independently represents a hydrogen atom or a C1-C4 alkyl group; at least two of $R^1$, $R^2$, and $R^3$ are C1-C4 alkyl groups; the number of carbon atoms in $R^1$, $R^2$, and $R^3$ is 4 to 12 in total; and X represents an oxygen atom or an imino group. It is preferred that any two of $R^1$, $R^2$, and $R^3$ in the compound represented by formula (1) above are C1-C4 alkyl groups and the other one is a hydrogen atom; and it is more preferred that any two of $R^1$, $R^2$, and $R^3$ in the compound represented by formula (1) above are ethyl groups and the other one is a hydrogen atom.

Examples of the above C1-C4 alkyl group include, for example, methyl group, ethyl group, n-propyl group, isopropyl group, isobutyl group, n-butyl group, sec-butyl group, tert-butyl group, cyclopropyl group, and cyclobutyl group. Examples of the imino group includes —NH— and —N(CH$_3$)—.

The above violet ink contains at least one selected from the group consisting of C.I. Disperse Violet 27 and C.I. Disperse Violet 28 as the water-insoluble colorant. The dyes may be used independently or in a mixture, yet C.I. Disperse Violet 27 and C.I. Disperse Violet 28 are preferably contained independently.

The above ink set may further contain at least one yellow ink.

The yellow ink is preferably, for example, one selected from the group consisting of C.I. Disperse Yellow, C.I. Disperse Orange, C.I. Solvent Yellow, and C.I. Solvent Orange. Specific examples include, for example, C.I. Disperse Yellow 1-10, 11:1, 12-17, 19-28, 31-35, 38, 39, 42-44, 47, 49-51, 54, 56-184, 184:1, 185-232, 234-243, 245-256; C.I. Solvent Yellow 1-3, 3:1, 4-24, 25:1, 25-30, 30:1, 31-43, 44:1, 44-52, 55-62, 64, 65, 68-74, 76-82, 83:1, 83-91, 93-126, 128-141, 143-160, 160:1, 161-165, 167-196, 199; C.I. Disperse Orange 1, 1:1, 2, 3, 3:1, 5-24, 25:1, 25, 27-41, 41:1, 42-58, 60-91, 93, 94, 96-98, 100-143, 145-151, 153-158; and C.I. Solvent Orange 1-6, 7:1, 7-36, 37:1, 37-40, 40:1, 41, 43-66, 68-77, 79-87, 90-99, 101-116. Preferably, C.I. Disperse Yellow 54 is contained.

The above ink set may further contain at least one magenta ink.

A dye contained in the magenta ink is preferably, for example, a dye selected from C.I. Disperse Red, C.I. Solvent Red, and C.I. Vat Red. Specific examples include, for example, C.I. Disperse Red 1-5, 5:1, 6-13, 15-29, 30:1, 30-36, 38, 40, 41, 43, 43:1, 46, 48, 50, 52-54, 54:1, 55:1, 55, 56, 58-61, 63-65, 69, 70, 72-74, 74:1, 75-78, 80-82, 84-86, 86:1, 87, 88, 90-94, 96-98, 100, 102-111, 113, 115-118, 120-123, 125-146, 148-167, 167:1, 168-190, 190:1, 191, 191:1, 192-211, 214-222, 224-272, 274-302, 302:1, 303-336, 338-350, 352-354, 356-364, 366-386, 388, 391, 392; C.I. Solvent Red 1-24, 24:1, 25-27, 29-36, 36:1, 37-49, 49:1, 50-83, 83:1, 84:1, 84-87, 89, 90:1, 90-92, 96-100, 102, 103, 105, 106, 108-119, 122-142, 144-146, 148-151, 153-157, 160, 161, 163, 164, 164:1, 164:2, 165-191, 194-237, 241-252, 254; and C.I. Vat Red 1, 2, 4-6, 8-26, 28-56, 60, 61. Preferably, C.I. Disperse Red 60 is contained.

The above ink set may further contain at least one second cyan ink. A dye contained in the second cyan ink is a dye other than the dye represented by formula (1) contained in the above cyan ink, and is preferably, for example, a dye selected from C.I. Disperse Blue and C.I. Solvent Blue. Specific examples include, for example, C.I. Disperse Blue 1, 1:1, 2, 3, 3:1, 4-6, 7, 8, 9:1, 9-13, 13:1, 14, 15-18, 19, 20, 21, 22, 23, 24, 26, 26:1, 27, 28-30, 31, 32-34, 35, 36, 38, 40, 42-45, 47-49, 51, 52, 53, 54, 55, 56, 58, 60:1, 60-62, 64:1, 64, 65, 68, 70, 72:1, 72, 73, 75, 76, 77, 79, 79:1, 79:2, 79:3, 80, 81:1, 81-83, 84, 85:1, 85, 86, 87:1, 87, 88-93, 94, 95, 96-98, 100, 101, 102, 103-105, 106, 106:1, 107, 108, 109, 111-117, 118, 119, 121-123, 124, 125-128, 130, 131, 132, 133, 134, 136-144, 145, 146, 147, 148-150, 151-156, 158, 159-164, 165:1, 165:2, 165:3, 166-171, 173-177, 179, 180, 180:1, 181, 182, 183:1, 183, 184-190, 191-194, 196-256, 257-270, 271, 272-279, 280, 280:1, 281, 282, 283, 284, 285-290, 291, 292, 293, 294, 295-298, 299-314, 315-321, 322, 323-333, 334, 335, 336, 337, 338, 339, 340-343, 344, 345, 346, 347, 349-352, 353, 354, 355, 356, 358, 359, 360-363, 364-366, 367-371, 372, 373, 374, 375-383, 385-387; and C.I. Solvent Blue 1, 2, 3-7, 8-10, 11, 12, 13-15, 16, 17, 18, 19-24, 25, 26, 27, 28, 30, 31, 32, 33, 34-38, 39, 40-45, 46, 48, 49, 50, 51, 52-55, 56-59, 59:1, 63, 64, 65, 66, 67-70, 71, 72, 74-76, 78, 79, 80, 81, 82-87, 88-93, 94, 95, 96, 97-102, 103, 104-115, 116, 117, 118, 119, 120, 121, 122-124, 125-127, 128, 129, 130-133, 134-136, 137, 138, 139, 141, 142, 143-145, 146, 147, 148, 266. Preferably, C.I. Disperse Blue 359 is contained.

The above ink set may further contain at least one orange ink.

Examples of a dye contained in the orange ink include C.I. Disperse Orange and C.I. Solvent Orange that are given as dyes contained in the above yellow ink. Preferably, C.I. Disperse Orange 25 is contained.

The above ink set may further contain part or all of low-density inks corresponding to the above inks. The content of the dye in the low-density ink is set to be lower than that of each corresponding ink.

For the above ink set, other inks may be added in addition to the above inks.

The above inks may each be a water-based ink containing water and, if necessary, an organic solvent or be an ink that is substantially free of water, that is, a solvent ink. The term "ink substantially free of water" herein refers to an ink to which no water is deliberately added.

For each ink, the content of water is preferably in a range of 40% by mass to 70% by mass.

Examples of the organic solvent include, for example, C1-C4 alcohols such as methanol, ethanol, n-propanol, isopropanol, n-butanol, isobutanol, secondary butanol, and tertiary butanol; amides such as N,N-dimethylformamide and N,N-dimethylacetamide; heterocyclic ketones such as 2-pyrrolidone, N-methyl-2-pyrrolidone, hydroxyethyl-2-pyrrolidone, 1,3-dimethylimidazolidin-2-one, or 1,3-dimethylhexahydropyrimido-2-one; ketones or ketoalcohols such as acetone, methyl ethyl ketone, and 2-methyl-2-hydroxypentane-4-one; cyclic ethers such as tetrahydrofuran and dioxane; diols such as ethylene glycol, 1,2-propanediol, 1,3-propanediol, 2-methyl-1,3-propanediol, 1,2-butanediol, 1,4-butanediol, 1,2-pentanediol, 1,5-pentanediol, 1,2-hexanediol, and 1,6-hexanediol; di-, oligo-, or polyalkylene glycols or thioglycols having C2-C6 alkylene units such as diethylene glycol, triethylene glycol, tetraethylene glycol, dipropylene glycol, polyethylene glycol, polypropylene glycol, and thiodiglycol; polyols (preferably triols) such as glycerin, hexane-1,2,6-triol, and trimethylolpropane; C1-C4 monoalkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, and triethylene glycol monoethyl ether; γ-butyrolactone; and dimethyl sulfoxide. Further, examples of water-soluble organic solvent that is highly soluble in water include organic solvents selected from diols, di-, oligo-, or polyalkylene glycols having C2-C6 alkylene units, and heterocyclic ketones. Of these, C2-C6 alcohols having two to three alcoholic hydroxy groups; di- or tri-C2-C3 alkylene glycols; and poly C2-C3 alkylene glycols (preferably, liquid polyalkylene glycols) with four or more repeating units and a molecular weight of approximately 20,000 or less are preferred. Specific examples include, for example, diols such as ethylene glycol, propylene glycol, 1,3-pentanediol, and 1,5-pentanediol; C2-C6 alcohols having two to three hydroxy groups, such as glycerin and trimethylolpropane; di- or tri-C2-C3 alkylene glycols such as diethylene glycol, triethylene glycol, polyethylene glycol, and polypropylene glycol; and heterocyclic ketones such as 2-pyrrolidone and N-methyl-2-pyrrolidone.

Further, for example, compounds that are solved in water to form wetting agents are herein included in water-soluble organic solvents for convenience; examples can include urea, ethylene urea, and saccharides.

When the above inks are water-based inks, the content of the organic solvents with respect to the total mass of the inks is typically 0% to 60%, preferably 5% to 50%.

On the other hand, when the above inks are solvent inks, each ink contains the water-insoluble colorant and an ink preparation added into the ink as necessary, which will be described below, with the balance being an organic solvent. The inks contained in the above ink set are preferably water-based inks.

The above water-based inks each preferably further contains a dispersant. An organic solvent used in this case is preferably selected from the above water-soluble organic solvents. As the dispersant, one dispersant may be used, or two or more dispersant may be used in combination. Further, the compound represented by formula (1) contained in the above cyan ink; C.I. Disperse Violet 27 and C.I. Disperse Violet 28 contained in the above violet ink; and part or all of the dyes contained in the above inks that may be contained in the above ink set may be coated with the dispersant(s).

Examples of the above dispersant include, for example, nonionic dispersants, anionic dispersants, and polymeric dispersants. The dispersant can be appropriately selected depending on the intended use. The amount of the dispersant used is typically 1% to 100% with respect to the total mass of the compound represented by formula (1) in terms of solid content, and may be set to preferably 5% to 90%, more preferably 10% to 80%.

Examples of the nonionic dispersant include, for example, polyoxyethylene alkyl ether, polyoxyethylene alkyl aryl ether, polyoxyethylene polyoxypropylene glycol, glycerin ester, sorbitan ester, sucrose ester, polyoxyethylene ether of glycerin ester, polyoxyethylene ether of sorbitan ester, polyoxyethylene ether of sorbitol ester, fatty acid alkanolamide, polyoxyethylene fatty acid amide, amine oxide, polyoxyethylene alkyl amine, polyoxyethylene-β-naphthyl ether, polyoxyethylene styrylphenyl ether, and polyoxyethylene distyrylphenol ether.

As an anionic dispersant, for example, a formalin condensate of polymeric sulfonic acid, preferably aromatic sulfonic acid; a salt thereof; or a mixture thereof (hereinafter, "formalin condensate of sulfonic acid" may mean to include "its salt or a mixture thereof") is preferred. Examples of "its salt" include salts such as sodium salts, potassium salts, and lithium salts. Examples of the above formalin condensate of aromatic sulfonic acid include, for example, formalin condensates of creosote oil sulfonic acid; cresol sulfonic acid; phenol sulfonic acid; β-naphthalene sulfonic acid; β-naphthol sulfonic acid; β-naphthalene sulfonic acid and β-naphthol sulfonic acid; benzene sulfonic acid; cresol sulfonic acid and 2-naphthol-6-sulfonic acid; and lignin sulfonic acid; etc. Of these, formalin condensates of creosote oil sulfonic acid; β-naphthalene sulfonic acid; and lignin sulfonic acid are preferred. The anionic dispersant can be available for example as DEMOL N, DEMOL C, DEMOL SN-B (produced by Kao Corporation); the LAVELIN W series, the LAVELIN AN series (produced by DKS Co. Ltd.); VANILLEX N, VANILLEX RN, VANILLEX G, PEARL-LEX DP (VANILLEX and PEARLLEX are registered trademarks in Japan, other countries, or both) (produced by Nippon Paper Industries Co., Ltd.); etc.

Examples of the above polymeric dispersant include, for example, a copolymer of at least two monomers (preferably, at least one of them is a hydrophilic monomer) selected from monomers of the group consisting of styrene and its derivatives (preferably, a monomer selected from styrene and α-methylstyrene); vinylnaphthalene and its derivatives; aliphatic alcohol esters of α,β-ethylenically unsaturated carboxylic acid; (meth)acrylic acid and its derivatives; maleic acid and its derivatives; itaconic acid and its derivatives; fumaric acid and its derivatives; and vinyl acetate, vinyl alcohol, vinyl pyrrolidone, acrylamide, and their derivatives, and/or salts of the copolymers. Examples of the copolymer include for example, block copolymers, random copolymers, and graft copolymers. Note that (meth)acrylic acid herein refers to either methacrylic acid or acrylic acid. Of these, a copolymer composed of at least two monomers selected from styrene and its derivatives; and (meth)acrylic acid and its derivatives is preferred. Preferred specific examples of the polymeric dispersant include, for example, the JONCRYL series (JONCRYL is a registered trademark in Japan, other countries, or both) produced by BASF SE, such as JONCRYL 67, 68, 586, 611, 678, 680, 682, 683, and 690; and JONCRYL 68, 678, 682, 683, and 690 are particularly preferable.

The above inks may each further contain an ink preparation. Examples of the ink preparation include, for example, surfactants, preservatives/antimicrobials, and pH adjusters. The ink preparation may be added in an amount such that the effects of the present disclosure would not be undermined, and the total content of the ink preparations is typically 0% to 25%, preferably 0.01% to 20% with respect to the total mass of the inks.

Examples of the above surfactant include, for example, anionic surfactants, nonionic surfactants, cationic surfactants, and amphoteric surfactants.

Examples of the above anionic surfactants include, for example, aliphatic acid soap, N-acyl-N-methylglycine salts, N-acyl-N-methyl-β-alanine salts, N-acylglutamic acid salts, alkyl ether carboxylic acid salts, acylated peptides, alkyl sulfonic acid salts, alkylbenzene sulfonic acid salts, alkylnaphthalene sulfonic acid salts, dialkylsulfosuccinic acid ester salts, alkyl sulfoacetic acid slats, α-olefin sulfonic acid salts, N-acylmethyltaurine, sulfated oil, higher alcohol sulfuric acid ester salts, secondary higher alcohol sulfuric acid ester salts, alkyl ether sulfate salts, secondary higher alcohol ethoxy sulfates, polyoxyethylene alkylphenyl ether sulfate salts, monoglysulfates, aliphatic acid alkylamide sulfate ester salts, alkyl ether phosphoric acid ester salts, and alkyl phosphoric acid ester salts. The anionic surfactants are available as the ADEKA COL series (EC-8600 etc.) (ADEKA is a registered trademark in Japan, other countries, or both) produced by ADEKA Corporation, the HITENOL series (NE-15 etc.) (HITENOL is a registered trademark in Japan, other countries, or both) produced by produced by DKS Co. Ltd, or the PELEX series (OT-P etc.) (PELEX is a registered trademark in Japan, other countries, or both) produced by Kao Corporation.

Examples of the above nonionic surfactants include, for example, polyoxyethylene alkyl ether, polyoxyethylene secondary alcohol ether, polyoxyethylene alkyl phenyl ether, polyoxyethylene sterol ether, polyoxyethylene lanolin derivatives, polyoxyethylene polyoxypropylene alkyl ether, polyoxyethylene glycerin fatty acid ester, polyoxyethylene castor oil, hardened castor oil, polyoxyethylene sorbitan fatty acid ester, polyoxyethylene sorbitol fatty acid ester, polyethylene glycol fatty acid ester, fatty acid monoglyceride, polyglycerin fatty acid ester, sorbitan fatty acid ester, propylene glycol fatty acid ester, sucrose fatty acid ester, fatty acid alkanolamide, polyoxyethylene fatty acid amide, polyoxyethylene alkyl amine, alkyl amine oxide, acetylene glycol, and acetylene alcohol. The nonionic surfactants are available as the NEWPOL series (PE-62 etc.) produced by Sanyo Chemical Industries, Ltd., the OLFINE series (E1004, E1010, etc.) (OLFINE is a registered trademark in Japan, other countries, or both) produced by Nissin Chemical Industry Co., Ltd., the SURFYNOL series (420, 440, 465, etc.) (SURFYNOL is a registered trademark in Japan, other countries, or both) produced by Air Products and Chemicals, Inc., the SOFTANOL series (EP5035 etc.) (SOFTANOL is a registered trademark in Japan, other countries, or both) produced by NIPPON SHOKUBAI CO., LTD., and the EMULGEN series (911, A-60, etc.) produced by Kao Corporation.

Examples of the above cationic surfactants include, for example, 2-vinylpyridine derivatives and poly-4-vinylpyridine derivatives.

Examples of the above amphoteric surfactants include lauryldimethylaminoacetic acid betaine, 2-alkyl-N-carboxymethyl-N-hydroxyethylimidazolinium betaine, coconut oil fatty acid amidopropyldimethylaminoacetic acid betaine, polyoctylpolyaminoethylglycine, and imidazoline derivatives.

The above preservatives/antimicrobials include, for example, sodium dehydroacetate, sodium benzoate, sodium pyridinethione-1-oxide, zinc pyridinethione-1-oxide, 1,2-benzisothiazolin-3-one, amine salts of 1-benzisothiazolin-3-one, Proxel GXL produced by Arch Chemical, Inc. or Lonza Group AG, MERGAL K-20 (MERGAL is a registered trademark in Japan, other countries, or both) produced by Troy Corporation, and DOW ROCIMA 640 by Dow, Inc.

Examples of the pH adjusters include, for example, alkali hydroxides such as sodium hydroxide, potassium hydroxide, and lithium hydroxide; and tertiary amines such as triethanolamine, diethanolamine, dimethyl ethanolamine, and diethyl ethanolamine.

The above inks can be made using dispersions prepared to contain dyes.

A method of preparing a dispersion (preferably, an aqueous dispersion) prepared to obtain a cyan ink containing at least the compound represented by formula (1) above as a water-insoluble colorant may use a known method. An example of such a method is a method of mixing the compound represented by formula (1) and a dispersant and performing a dispersion process using a sand mill (also referred to as a bead mill), a roll mill, a ball mill, a paint shaker, an ultrasonic disperser, a microfluidizer, etc. Of these, a sand mill is preferred. For the preparation of a dispersion using a sand mill, beads having a diameter of approximately 0.01 mm to 1 mm are preferably used. Further, in the preparation of the dispersion, the dispersion efficiency can be increased for example by increasing the beads filling rate. After performing the dispersion process, the beads, contaminants, etc. are removed by for example filtration and/or centrifugal separation. At this point, particles having a size significantly larger than the mean particle size set as a target are preferably also removed. The removal of such particles can prevent the printer head for the cyan ink to be obtained from being clogged. Further, when bubbles are formed in the preparation of the dispersion, for example a known silicone-based or acetylene glycol-based antifoaming agent can be added in a slight amount. Examples of the antifoaming agent include, for example, the OLFINE series (SK-14 etc.) produced by Nissin Chemical Industry Co., Ltd.; the SURFYNOL series (104, DF-110D, etc.) produced by Air Products and Chemicals, Inc.

An example of a method of preparing each of the above inks may be, for example, a method of mixing the above aqueous dispersion, the water-soluble organic solvent, and, if necessary, an ink preparation. The order of mixing those is not limited.

The viscosity of each ink at 25° C. is preferably approximately 2 mPa·s to 20 mPa·s when measured with an E-type viscosity meter. Further, when measured by the Wilhelmy plate method, the surface tension is preferably approximately 20 mN/m to 45 mN/m, and the inks with the thus set surface tension give good discharge response, for example, in rapid recording using an industrial inkjet printer.

Contaminants and others can be removed from the above inks by microfiltration using a membrane filter, glass filter paper, etc. as necessary. When microfiltration is performed, the pore size of the filter etc. is typically 0.5 μm to 20 μm, preferably approximately 0.5 μm to 10 μm. The filtration after performing the above dispersion process can be performed in a manner similar to these filtrations.

Fiber on which textile printing has been performed using the above ink set is also provided according to the present disclosure.

Examples of the above hydrophobic fiber include, for example, polyester fiber, nylon fiber, triacetate fiber, diacetate fiber, polyamide fiber, and mixed fiber using two or more of these fibers. Further, mixed fibers of any of these with recycled fiber such as rayon or natural fiber such as cotton, silk, and wool are also included in hydrophobic fibers in this specification as long as the mixed fibers contain hydrophobic fiber. Fiber having an ink receiving layer (anti-bleeding layer) is also known as hydrophobic fiber and is included in the hydrophobic fibers in this specification. The method of forming the above ink receiving layer is known, and fiber having an ink receiving layer is also available as a commercial product. The material and the structure of the ink receiving layer are not limited, and can be selected as appropriate for example depending on the intended use.

A method of textile printing on hydrophobic fiber, including: a step A of applying ink droplets to the hydrophobic fiber with an inkjet printer using the above ink set; a step B of known steaming or baking by fixing the colorant in the ink droplets applied in the step A to the fiber by heat; and a step C of washing off part of the colorant left unfixed in the fiber is also provided according to the present disclosure. Steaming is performed, for example, by a method of treating fiber under conditions of typically at 170° C. to 180° C. for approximately 10 minutes using a high-temperature steamer, and typically at 120° C. to 130° C. for 20 minutes using a high-pressure steamer. Baking (thermosol) is performed, for example, by a method of treating fiber under conditions of typically at 190° C. to 210° C. for approximately 60 seconds to 120 seconds. Fiber obtained through textile printing in the above manner may be washed with hot water and, if necessary, water, thereby removing the dyes that are not fixed. The hot water and water used for washing may contain a surfactant. Fiber having been washed is preferably dried at typically 50° C. to 120° C. for 5 minutes to 30 minutes.

A method of textile printing on hydrophobic fiber, including: applying ink droplets to an intermediate recording medium with an inkjet printer using the above ink set to obtain a recorded image; and then bringing the hydrophobic fiber into contact with a surface of the intermediate recording medium to which the ink droplets have been applied, followed by heat treatment typically at 170° C. to 220° C., thereby transferring the recorded image to the hydrophobic fiber is also provided according to the present disclosure.

The intermediate recording medium preferably such that the colorant in the ink that is attached to the intermediate recording medium does not aggregate on its surface, and the sublimation of the colorant is not prevented when a recorded image is transferred to a recording medium. An example of the intermediate recording medium is paper having an ink receiving layer; for example, inkjet printing paper etc. can be used.

The above method of textile printing on hydrophobic fiber, further including a fiber pretreatment step of adding an aqueous solution containing at least one or more sizing agents, an alkaline substance, an anti-reducing agent, and a hydrotropic agent to the fiber to be subjected to the application of the inks is also provided according to the present disclosure. Examples of the sizing agents include natural gums such as guar gum and locust bean gum; starches; sodium alginate; marine algae such as ones belonging to the genus gloiopeltis; plant peels that produces for example pectic acid; cellulose derivatives such as methyl cellulose, ethyl cellulose, hydroxyethyl cellulose, and carboxymethyl cellulose; modified starches such as carboxymethyl starch; polyvinyl alcohol; and synthetic glues such as polyacrylic acid ester. Examples of the alkaline substance include, for example, alkali metal salts of inorganic acids or organic acids; salts of alkaline earth metals; and substances selected from the compounds that liberate alkali when heated. Specific examples include, for example, hydroxides of alkali metals such as sodium hydroxide and calcium hydroxide; alkali metal salts of inorganic compounds such as sodium carbonate, sodium hydrogen carbonate, potassium carbonate, sodium dihydrogen phosphate, disodium hydrogen phosphate, and sodium phosphate; and alkali metal salts of organic compounds such as sodium formate, and sodium trichloroacetate. An example of the anti-reducing agent is sodium meta-nitrobenzene sulfonate. Examples of the hydrotropic agent include, ureas such as urea and dimethyl urea. For each of the above sizing agents, alkaline substance, anti-reducing agent, and hydrotropic agent; a single compound can be used. Alternatively, a plurality of compounds can be used in combination. The contents of pretreatment chemicals with respect to the total mass of a pretreatment agent are, for example, sizing agent: 0.5% to 5%, alkaline substance: 0.5% to 5%, anti-reducing agent: 0% to 5%, hydrotropic agent: 1% to 20%, and the balance being water. In a pretreatment, a solution containing the pretreatment chemicals such as the sizing agent, alkaline substance, anti-reducing agent, and hydrotropic agent is preferably applied as the pretreatment agent to fiber by a method selected from impregnation, coating, inkjet recording, etc. Specific examples include, for example, the padding method. The pick-up ratio in padding is preferably approximately 40% to 90%, more preferably approximately 60% to 80%.

The disclosed method can increase the reproducible gamut range without using unlimited kinds or number of dyes as in conventional textile printing methods using for example colored paste. Further, the disclosed ink set provides excellent coloring. Moreover, the disclosed ink set is excellent in fastnesses such as lightfastness, rub fastness, gas fastness, chlorine fastness, perspiration fastness, and washing fastness; and the disclosed ink set is particularly superior to ink sets of conventional inkjet inks in lightfastness.

EXAMPLES

The ink set and the textile printing method according to the present disclosure will now be described in more detail using Examples. However, the present disclosure is not limited by Examples in any way. The term "water" used in Examples refers to "deionized water" unless otherwise specified.

Synthesis Example 1

Synthesis of Compound Represented by Formula (1-1)

A solution was obtained by adding 3 parts of 1,4-diamino-2,3-anthraquinone-dicarboximide and 25 parts of 3-aminopentane into 75 parts of sulfolane. The solution obtained was heated to 140° C. in an autoclave and was allowed to react for 6 hours, followed by cooling to room temperature, thus a solution was obtained. Solid precipitated from the solution obtained was separated by filtration, and was washed with 100 parts of methanol and 200 parts of water, followed by drying, thus 3.1 parts of the compound represented by formula (1-1) below.

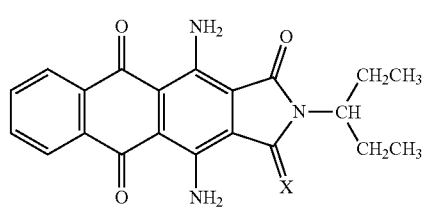

(1-1)

Synthesis Example 2

Synthesis of Compound Represented by Formula (1-2)

A solution was obtained by adding 3.0 parts of 1,4-diamino-2,3-anthraquinone-dicarboximide and 25 parts of 2-aminopentane into 75 parts of sulfolane. The solution obtained was heated to 140° C. in an autoclave and was allowed to react for 6 hours, followed by cooling to room temperature, thus a liquid was obtained. Solids precipitated from the solution obtained were separated by filtration, and was washed with 100 parts of methanol and 200 parts of water, followed by drying, thus 2.9 parts of the compound represented by formula (1-2) below.

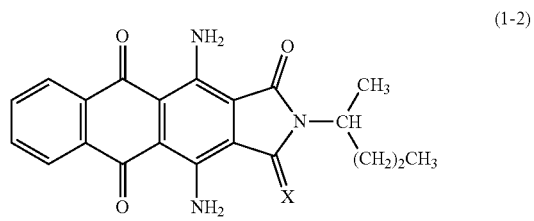

(1-2)

Preparation of Emulsion Liquid

Preparation Example 1

An emulsion liquid of Joncryl 678 (produced by BASF SE) was obtained by adding 20 parts of Joncryl 678 to 3.2 parts of 48% sodium hydroxide, 56.8 parts of deionized water, and 20 parts of propylene glycol, followed by stirring at raised temperatures of 90° C. to 120° C. for 5 hours.

Preparation of Aqueous Dispersion

Preparation Example 2

As a sublimable dye, a mixture composed of 30 parts of C.I. Disperse Yellow 54, 60 parts of the above emulsion liquid of Joncryl 678, 0.2 parts of Proxel GXL (produced by Lonza Group AG), 0.4 parts of SURFYNOL 104PG50 (produced by Air Products and Chemicals, Inc), and 24 parts of deionized water was subjected to a dispersion process for approximately 15 hours by sand milling using glass beads having a diameter of 0.2 mm while being cooled. To the solution obtained, 60 parts of deionized water and 30 parts of the emulsion liquid of Joncryl 678 were added to control the dye content to 15%, and the solution was subjected to filtration using glass fiber filter paper GC-50 (produced by TOYO ROSHI KAISHA, LTD., the filter pore size: 0.5 μm), thus an aqueous dispersion 1 was obtained.

Preparation Example 3

As a sublimable dye, a mixture composed of 30 parts of C.I. Disperse Red 60, 60 parts of the above emulsion liquid of Joncryl 678, 0.2 parts of Proxel GXL (produced by Lonza Group AG), 0.4 parts of SURFYNOL 104PG50 (produced by Air Products and Chemicals, Inc), and 24 parts of deionized water was subjected to a dispersion process for approximately 15 hours by sand milling using glass beads having a diameter of 0.2 mm while being cooled. To the solution obtained, 60 parts of deionized water and 30 parts of the emulsion liquid of Joncryl 678 were added to control the dye content to 15%, and the solution was subjected to filtration using glass fiber filter paper GC-50 (produced by TOYO ROSHI KAISHA, LTD., the filter pore size: 0.5 μm), thus an aqueous dispersion 2 was obtained.

Preparation Example 4

As a sublimable dye, a mixture composed of 30 parts of C.I. Disperse Violet 27, 60 parts of the above emulsion liquid of Joncryl 678, 0.2 parts of Proxel GXL (produced by Lonza Group AG), 0.4 parts of SURFYNOL 104PG50 (produced by Air Products and Chemicals, Inc), and 24 parts of deionized water was subjected to a dispersion process for approximately 15 hours by sand milling using glass beads having a diameter of 0.2 mm while being cooled. To the solution obtained, 60 parts of deionized water and 30 parts of the emulsion liquid of Joncryl 678 were added to control the dye content to 15%, and the solution was subjected to filtration using glass fiber filter paper GC-50 (produced by TOYO ROSHI KAISHA, LTD., the filter pore size: 0.5 μm), thus an aqueous dispersion 3 was obtained.

Preparation Example 5

As a sublimable dye, a mixture composed of 30 parts of C.I. Disperse Blue 359, 60 parts of the above emulsion liquid of Joncryl 678, 0.2 parts of Proxel GXL (produced by Lonza Group AG), 0.4 parts of SURFYNOL 104PG50 (produced by Air Products and Chemicals, Inc), and 24 parts of deionized water was subjected to a dispersion process for approximately 15 hours by sand milling using glass beads having a diameter of 0.2 mm while being cooled. To the solution obtained, 60 parts of deionized water and 30 parts of the emulsion liquid of Joncryl 678 were added to control the dye content to 15%, and the solution was subjected to filtration using glass fiber filter paper GC-50 (produced by TOYO ROSHI KAISHA, LTD., the filter pore size: 0.5 μm), thus an aqueous dispersion 4 was obtained.

Preparation Example 6

As a sublimable dye, a mixture composed of 30 parts of the compound of formula (1-1), 60 parts of the above emulsion liquid of Joncryl 678, 0.2 parts of Proxel GXL (produced by Lonza Group AG), 0.4 parts of SURFYNOL 104PG50 (produced by Air Products and Chemicals, Inc), and 24 parts of deionized water was subjected to a dispersion process for approximately 15 hours by sand milling using glass beads having a diameter of 0.2 mm while being cooled. To the solution obtained, 60 parts of deionized water and 30 parts of the emulsion liquid of Joncryl 678 were added to control the dye content to 15%, and the solution was subjected to filtration using glass fiber filter paper GC-50 (produced by TOYO ROSHI KAISHA, LTD., the filter pore size: 0.5 μm), thus an aqueous dispersion 5 was obtained.

Preparation Example 7

As a sublimable dye, a mixture composed of 30 parts of C.I. Disperse Orange 25, 60 parts of the above emulsion liquid of Joncryl 678, 0.2 parts of Proxel GXL (produced by Lonza Group AG), 0.4 parts of SURFYNOL 104PG50 (produced by Air Products and Chemicals, Inc), and 24 parts of deionized water was subjected to a dispersion process for approximately 15 hours by sand milling using glass beads having a diameter of 0.2 mm while being cooled. To the solution obtained, 60 parts of deionized water and 30 parts of the emulsion liquid of Joncryl 678 were added to control the dye content to 15%, and the solution was subjected to filtration using glass fiber filter paper GC-50 (produced by TOYO ROSHI KAISHA, LTD., the filter pore size: 0.5 μm), thus an aqueous dispersion 6 was obtained.

Preparation Example 8

As a sublimable dye, a mixture composed of 30 parts of C.I. Disperse Violet 28, 60 parts of the above emulsion liquid of Joncryl 678, 0.2 parts of Proxel GXL (produced by Lonza Group AG), 0.4 parts of SURFYNOL 104PG50 (produced by Air Products and Chemicals, Inc), and 24 parts of deionized water was subjected to a dispersion process for approximately 15 hours by sand milling using glass beads having a diameter of 0.2 mm while being cooled. To the solution obtained, 60 parts of deionized water and 30 parts of the emulsion liquid of Joncryl 678 were added to control the dye content to 15%, and the solution was subjected to filtration using glass fiber filter paper GC-50 (produced by TOYO ROSHI KAISHA, LTD., the filter pore size: 0.5 μm), thus an aqueous dispersion 7 was obtained.

Preparation of Water-Based Ink

Preparation Example 9

An ink having a composition in Table 1 was prepared by mixing 40 parts of the above aqueous dispersion 1; 15 parts of glycerin; 5 parts of propylene glycol; and a mixed solution of Proxel GXL (produced by Lonza Group AG), SURFYNOL 465 (produced by Nissin Chemical Industry Co., Ltd.), TEA-80 (produced by JUNSEI CHEMICAL CO., LTD.), and deionized water, followed by stirring and filtration through a 5 μm filter, thus water-based ink 1 was obtained.

Preparation Example 10

An ink having a composition in Table 1 was prepared by mixing 40 parts of the above aqueous dispersion 2; 15 parts of glycerin; 5 parts of propylene glycol; and a mixed solution of Proxel GXL (produced by Lonza Group AG), SURFYNOL 465 (produced by Nissin Chemical Industry Co., Ltd.), TEA-80 (produced by JUNSEI CHEMICAL CO., LTD.), and deionized water, followed by stirring and filtration through a 5 μm filter, thus water-based ink 2 was obtained.

Preparation Example 11

An ink having a composition in Table 1 was prepared by mixing 40 parts of the above aqueous dispersion 3; 15 parts of glycerin; 5 parts of propylene glycol; and a mixed solution of Proxel GXL (produced by Lonza Group AG), SURFYNOL 465 (produced by Nissin Chemical Industry Co., Ltd.), TEA-80 (produced by JUNSEI CHEMICAL CO., LTD.), and deionized water, followed by stirring and filtration through a 5 μm filter, thus water-based ink 3 was obtained.

Preparation Example 12

An ink having a composition in Table 1 was prepared by mixing 40 parts of the above aqueous dispersion 4; 15 parts of glycerin; 5 parts of propylene glycol; and a mixed solution of Proxel GXL (produced by Lonza Group AG), SURFYNOL 465 (produced by Nissin Chemical Industry Co., Ltd.), TEA-80 (produced by JUNSEI CHEMICAL CO., LTD.), and deionized water, followed by stirring and filtration through a 5 μm filter, thus water-based ink 4 was obtained.

Preparation Example 13

An ink having a composition in Table 1 was prepared by mixing 40 parts of the above aqueous dispersion 5; 15 parts of glycerin; 5 parts of propylene glycol; and a mixed solution of Proxel GXL (produced by Lonza Group AG), SURFYNOL 465 (produced by Nissin Chemical Industry Co., Ltd.), TEA-80 (produced by JUNSEI CHEMICAL CO., LTD.), and deionized water, followed by stirring and filtration through a 5 μm filter, thus water-based ink 5 was obtained.

Preparation Example 14

An ink having a composition in Table 1 was prepared by mixing 40 parts of the above aqueous dispersion 6; 15 parts of glycerin; 5 parts of propylene glycol; and a mixed solution of Proxel GXL (produced by Lonza Group AG), SURFYNOL 465 (produced by Nissin Chemical Industry Co., Ltd.), TEA-80 (produced by JUNSEI CHEMICAL CO., LTD.), and deionized water, followed by stirring and filtration through a 5 μm filter, thus water-based ink 6 was obtained.

Preparation Example 15

An ink having a composition in Table 1 was prepared by mixing 40 parts of the above aqueous dispersion 7; 15 parts of glycerin; 5 parts of propylene glycol; and a mixed solution of Proxel GXL (produced by Lonza Group AG), SURFYNOL 465 (produced by Nissin Chemical Industry Co., Ltd.), TEA-80 (produced by JUNSEI CHEMICAL CO., LTD.), and deionized water, followed by stirring and filtration through a 5 μm filter, thus water-based ink 7 was obtained.

Preparation Example 16

An ink having a composition in Table 1 was prepared by mixing 20 parts of the above aqueous dispersion 3; 20 parts of the above aqueous dispersion 7; 15 parts of glycerin; 5 parts of propylene glycol; and a mixed solution of Proxel GXL (produced by Lonza Group AG), SURFYNOL 465 (produced by Nissin Chemical Industry Co., Ltd.), TEA-80 (produced by JUNSEI CHEMICAL CO., LTD.), and deionized water, followed by stirring and filtration through a 5 μm filter, thus water-based ink 8 was obtained.

The compositions for the above Preparation Examples 9 to 16 are given in Table 1 below.

TABLE 1

| Component | Water-based ink 1 | Water-based ink 2 | Water-based ink 3 | Water-based ink 4 | Water-based ink 5 | Water-based ink 6 | Water-based ink 7 | Water-based ink 8 |
|---|---|---|---|---|---|---|---|---|
| Aqueous dispersion 1 | 40 | | | | | | | |
| Aqueous dispersion 2 | | 40 | | | | | | |
| Aqueous dispersion 3 | | | 40 | | | | | 20 |
| Aqueous dispersion 4 | | | | 40 | | | | |
| Aqueous dispersion 5 | | | | | 40 | | | |
| Aqueous dispersion 6 | | | | | | 40 | | |
| Aqueous dispersion 7 | | | | | | | 40 | 20 |
| Glycerin | 15 | 15 | 15 | 15 | 15 | 15 | 15 | 15 |
| Propylene glycol | 5 | 5 | 5 | 5 | 5 | 5 | 5 | 5 |
| Proxel GXL | 0.1 | 0.1 | 0.1 | 0.1 | 0.1 | 0.1 | 0.1 | 0.1 |
| SURFYNOL 465 | 0.2 | 0.2 | 0.2 | 0.2 | 0.2 | 0.2 | 0.2 | 0.2 |
| TEA-80 | 0.1 | 0.1 | 0.1 | 0.1 | 0.1 | 0.1 | 0.1 | 0.1 |
| Deionized water | Balance | Balance | Balance | Balance | Balance | Balance | Balance | Balance |
| Total | 100 | 100 | 100 | 100 | 100 | 100 | 100 | 100 |

Preparation of Dyed Cloth

The above water-based inks were combined as in Table 3 below to obtain ink sets of Examples 1 to 7 and Comparative Examples 1 to 3.

Example 1

Ink sets were such that two of the above water-based inks obtained in Preparation Examples above were combined in each ink set:
- a combination in which the water-based ink 1 was loaded into the yellow cartridge, and the water-based ink 2 was loaded into the magenta cartridge [Combination A1-1],
- a combination in which the water-based ink 2 was loaded into the magenta cartridge, and the water-based ink 3 was loaded into the cyan cartridge [Combination A1-2],
- a combination in which the water-based ink 3 was loaded into the magenta cartridge, and the water-based ink 5 was loaded into the cyan cartridge [Combination A1-3], and
- a combination in which the water-based ink 1 was loaded into the yellow cartridge, and the water-based ink 5 was loaded into the cyan cartridge [Combination A1-4].

Using each of the above ink sets, printing was performed on sublimation transfer paper (transfer paper IJ-SPF62 produced by Mitsubishi Paper Mills Limited) serving as an intermediate recording medium so that the tone (print density) patterns of the ink sets were combined in a matrix with an inkjet printer PX-205 (produced by Seiko Epson Corporation). The surface of each transfer paper obtained, to which the inks had been applied was brought into contact with polyester cloth (Tropical, produced by TEIJIN LIMITED). Total 21 patches were prepared such that the two water-based inks in each of the above four combinations would have a tone pattern of 100/0, 100/10, 100/20, 100/30, 100/40, 100/50, 100/60, 100/70, 100/80, 100/90, 100/100, 90/100, 80/100, 70/100, 60/100, 50/100, 40/100, 30/100, 20/100, 10/100, and 0/100. Color gamut evaluation was performed on the patches. For example, the relationships between the patches for the combination in which the water-based ink 1 was loaded into the yellow cartridge, and the water-based ink 2 was loaded into the magenta cartridge ([Combination A1-1] above) and the tone patterns of the water-based ink 1 and the water-based ink 2 are as given in Table 2 below.

TABLE 2

| Patch No. | Water-based ink 1/ Water-based ink 2 |
|---|---|
| 1 | 100/0 |
| 2 | 100/10 |
| 3 | 100/20 |
| 4 | 100/30 |
| 5 | 100/40 |
| 6 | 100/50 |
| 7 | 100/60 |
| 8 | 100/70 |
| 9 | 100/80 |
| 10 | 100/90 |
| 11 | 100/100 |
| 12 | 90/100 |
| 13 | 80/100 |
| 14 | 70/100 |
| 15 | 60/100 |
| 16 | 50/100 |
| 17 | 40/100 |
| 18 | 30/100 |
| 19 | 20/100 |
| 20 | 10/100 |
| 21 | 0/100 |

As with [Combination A1-1] above, patches were prepared for [Combination A1-2] to [Combination A1-4] and subjected to color gamut evaluation. Thus, the ink sets for the total four colors were evaluated, and the data given in FIG. 1 were obtained. The patches (transfer paper)/polyester cloths on which printing had been performed were subjected to heat treatment at 200° C. for 30 seconds using a heat press machine (AF-65TEN produced by ASAHI GARMENT MACHINERY Co., Ltd.), thereby performing sublimation transfer from the transfer paper to each polyester cloth. Thus dyed cloths were obtained. The dyed cloths obtained were used as test dyed cloths and were subjected to the evaluation tests described below.

Example 2

The evaluation tests described below were performed on test cloths obtained in the same manner as in Example 1 except that ink sets of total five colors were such that two of the above water-based inks obtained in Preparation Examples above were combined in each ink set:
a combination in which the water-based ink 1 was loaded into the yellow cartridge, and the water-based ink 6 was loaded into the magenta cartridge [Combination A2-1],
a combination in which the water-based ink 2 was loaded into the magenta cartridge, and the water-based ink 3 was loaded into the cyan cartridge [Combination A2-2],
a combination in which the water-based ink 3 was loaded into the magenta cartridge, and the water-based ink 5 was loaded into the cyan cartridge [Combination A2-3],
a combination in which the water-based ink 1 was loaded into the yellow cartridge, and the water-based ink 5 was loaded into the cyan cartridge [Combination A2-4], and
a combination in which the water-based ink 6 was loaded into the yellow cartridge, and the water-based ink 2 was loaded into the magenta cartridge [Combination A2-5].

Example 3

The evaluation tests described below were performed on test cloths obtained in the same manner as in Example 1 except that ink sets of total four colors were such that two of the above water-based inks obtained in Preparation Examples above were combined in each ink set:
a combination in which the water-based ink 1 was loaded into the yellow cartridge, and the water-based ink 2 was loaded into the magenta cartridge [Combination A3-1],
a combination in which the water-based ink 2 was loaded into the magenta cartridge, and the water-based ink 7 was loaded into the cyan cartridge [Combination A3-2],
a combination in which the water-based ink 5 was loaded into the cyan cartridge, and the water-based ink 7 was loaded into the magenta cartridge [Combination A3-3], and
a combination in which the water-based ink 1 was loaded into the yellow cartridge, and the water-based ink 5 was loaded into the cyan cartridge [Combination A3-4].

Example 4

The evaluation tests described below were performed on test cloths obtained in the same manner as in Example 1 except that ink sets of total five colors were such that two of the above water-based inks obtained in Preparation Examples above were combined in each ink set:
a combination in which the water-based ink 2 was loaded into the magenta cartridge, and the water-based ink 7 was loaded into the cyan cartridge [Combination A4-1],
a combination in which the water-based ink 5 was loaded into the cyan cartridge, and the water-based ink 7 was loaded into the magenta cartridge [Combination A4-2],
a combination in which the water-based ink 1 was loaded into the yellow cartridge, and the water-based ink 5 was loaded into the cyan cartridge [Combination A4-3],
a combination in which the water-based ink 2 was loaded into the magenta cartridge, and the water-based ink 6 was loaded into the yellow cartridge [Combination A4-4], and
a combination in which the water-based ink 1 was loaded into the yellow cartridge, and the water-based ink 6 was loaded into the magenta cartridge [Combination A4-5].

Example 5

The evaluation tests described below were performed on test cloths obtained in the same manner as in Example 1 except that ink sets of total four colors were such that two of the above water-based inks obtained in Preparation Examples above were combined in each ink set:
a combination in which the water-based ink 1 was loaded into the yellow cartridge, and the water-based ink 2 was loaded into the magenta cartridge [Combination A5-1],
a combination in which the water-based ink 2 was loaded into the magenta cartridge, and the water-based ink 8 was loaded into the cyan cartridge [Combination A5-2],
a combination in which the water-based ink 5 was loaded into the cyan cartridge, and the water-based ink 8 was loaded into the magenta cartridge [Combination A5-3], and a combination in which the water-based ink 1 was loaded into the yellow cartridge, and the water-based ink 5 was loaded into the cyan cartridge [Combination A5-4].

Example 6

The evaluation tests described below were performed on test cloths obtained in the same manner as in Example 1 except that ink sets of total five colors were such that two of the above water-based inks obtained in Preparation Examples above were combined in each ink set:
a combination in which the water-based ink 1 was loaded into the yellow cartridge, and the water-based ink 2 was loaded into the magenta cartridge [Combination A6-1],
a combination in which the water-based ink 2 was loaded into the magenta cartridge, and the water-based ink 7 was loaded into the cyan cartridge [Combination A6-2],
a combination in which the water-based ink 4 was loaded into the cyan cartridge, and the water-based ink 7 was loaded into the magenta cartridge [Combination A6-3],
a combination in which the water-based ink 4 was loaded into the cyan cartridge, and the water-based ink 5 was loaded into the magenta cartridge [Combination A6-4], and
a combination in which the water-based ink 1 was loaded into the yellow cartridge, and the water-based ink 5 was loaded into the cyan cartridge [Combination A6-5].

Example 7

The evaluation tests described below were performed on test cloths obtained in the same manner as in Example 1 except that ink sets of total five colors were such that two of the above water-based inks obtained in Preparation Examples above were combined in each ink set:
a combination in which the water-based ink 1 was loaded into the yellow cartridge, and the water-based ink 2 was loaded into the magenta cartridge [Combination A7-1],
a combination in which the water-based ink 2 was loaded into the magenta cartridge, and the water-based ink 7 was loaded into the cyan cartridge [Combination A7-2],
a combination in which the water-based ink 3 was loaded into the cyan cartridge, and the water-based ink 7 was loaded into the magenta cartridge [Combination A7-3],
a combination in which the water-based ink 3 was loaded into the magenta cartridge, and the water-based ink 5 was loaded into the cyan cartridge [Combination A7-4], and
a combination in which the water-based ink 1 was loaded into the yellow cartridge, and the water-based ink 5 was loaded into the cyan cartridge [Combination A7-5].

Comparative Example 1

The evaluation tests described below were performed on test cloths obtained in the same manner as in Example 1 except that ink sets of total three colors were such that two of the above water-based inks obtained in Preparation Examples above were combined in each ink set:
a combination in which the water-based ink 1 was loaded into the yellow cartridge, and the water-based ink 2 was loaded into the magenta cartridge [Combination B1-1],
a combination in which the water-based ink 2 was loaded into the magenta cartridge, and the water-based ink 4 was loaded into the cyan cartridge [Combination B1-2], and
a combination in which the water-based ink 1 was loaded into the yellow cartridge, and the water-based ink 4 was loaded into the cyan cartridge [Combination B1-3].

Comparative Example 2

The evaluation tests described below were performed on test cloths obtained in the same manner as in Example 1 except that ink sets of total four colors were such that two of the above water-based inks obtained in Preparation Examples above were combined in each ink set:
a combination in which the water-based ink 1 was loaded into the yellow cartridge, and the water-based ink 2 was loaded into the magenta cartridge [Combination B2-1],
a combination in which the water-based ink 2 was loaded into the magenta cartridge, and the water-based ink 3 was loaded into the cyan cartridge [Combination B2-2],
a combination in which the water-based ink 3 was loaded into the magenta cartridge, and the water-based ink 4 was loaded into the cyan cartridge [Combination B2-3], and
a combination in which the water-based ink 1 was loaded into the yellow cartridge, and the water-based ink 4 was loaded into the cyan cartridge [Combination B2-4].

Comparative Example 3

The evaluation tests described below were performed on test cloths obtained in the same manner as in Example 1 except that ink sets of total four colors were such that two of the above water-based inks obtained in Preparation Examples above were combined in each ink set:
a combination in which the water-based ink 1 was loaded into the yellow cartridge, and the water-based ink 2 was loaded into the magenta cartridge [Combination B3-1],
a combination in which the water-based ink 2 was loaded into the magenta cartridge, and the water-based ink 7 was loaded into the cyan cartridge [Combination B3-2],
a combination in which the water-based ink 4 was loaded into the cyan cartridge, and the water-based ink 7 was loaded into the magenta cartridge [Combination B3-3], and
a combination in which the water-based ink 1 was loaded into the yellow cartridge, and the water-based ink 4 was loaded into the cyan cartridge [Combination B3-4].

TABLE 3

| | Water-based ink 1 | Water-based ink 2 | Water-based ink 3 | Water-based ink 4 | Water-based ink 5 | Water-based ink 6 | Water-based ink 7 | Water-based ink 8 |
|---|---|---|---|---|---|---|---|---|
| Example 1 | ● | ● | ● | | ● | | | |
| Example 2 | ● | ● | ● | | ● | ● | | |
| Example 3 | ● | ● | | | ● | ● | ● | |
| Example 4 | ● | ● | | | ● | ● | ● | |
| Example 5 | ● | ● | | | ● | | | ● |

TABLE 3-continued

|  | Water-based ink 1 | Water-based ink 2 | Water-based ink 3 | Water-based ink 4 | Water-based ink 5 | Water-based ink 6 | Water-based ink 7 | Water-based ink 8 |
| --- | --- | --- | --- | --- | --- | --- | --- | --- |
| Example 6 | ● | ● |  | ● | ● |  | ● |  |
| Example 7 | ● | ● | ● | ● | ● |  | ● |  |
| Comparative example 1 | ● | ● |  | ● |  |  |  |  |
| Comparative example 2 | ● | ● | ● | ● |  |  |  |  |
| Comparative example 3 | ● | ● |  | ● |  |  | ● |  |

[Evaluation of Depth of Shade]

Figure 2:
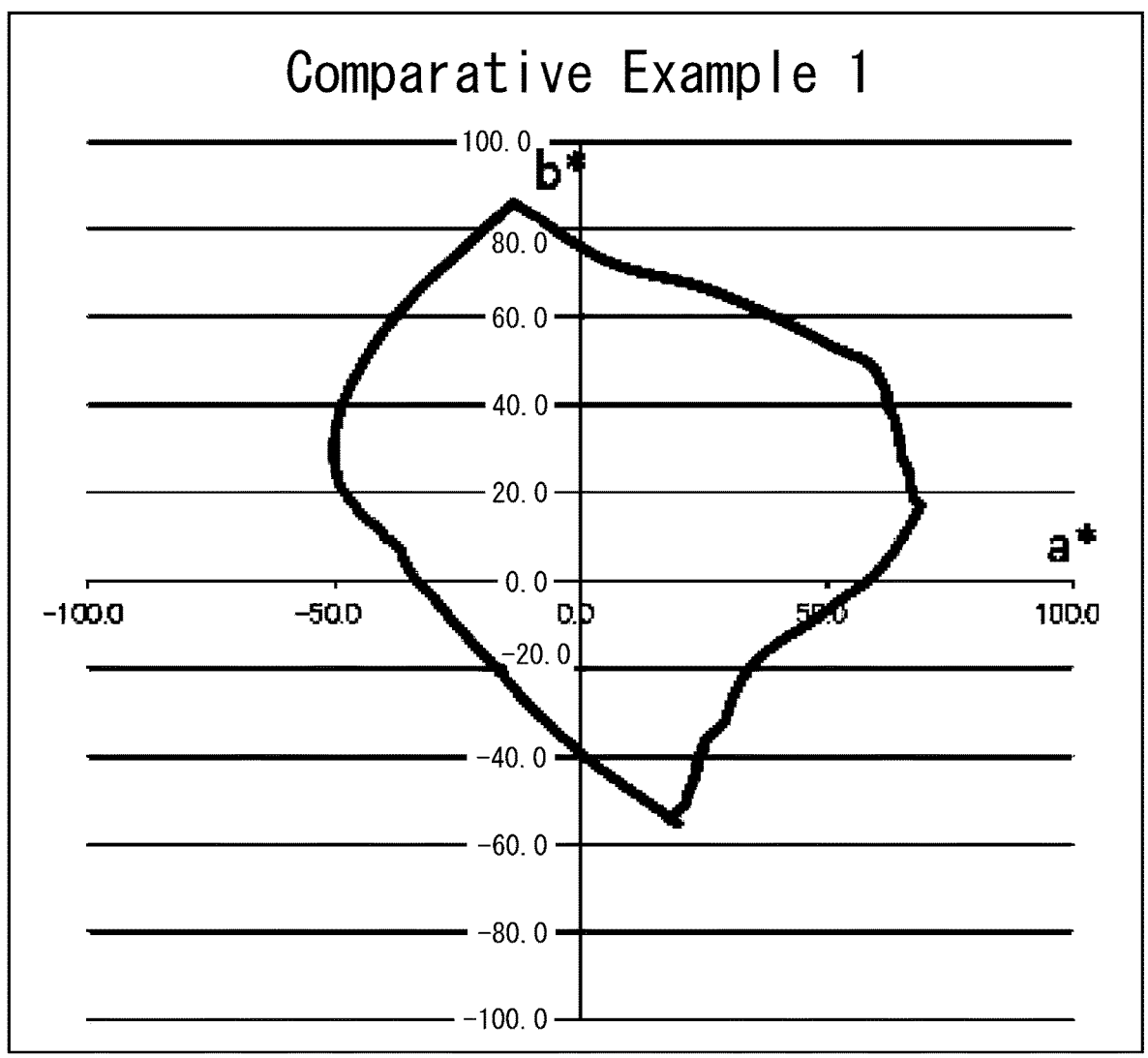
FIG. 2 shows diagrams in which a* and b* found by colorimetry on a dye transferred onto hydrophobic fiber are plotted on the XY coordinate using the patch obtained in each Comparative Example, and adjacent data points are connected.
Figure 2:
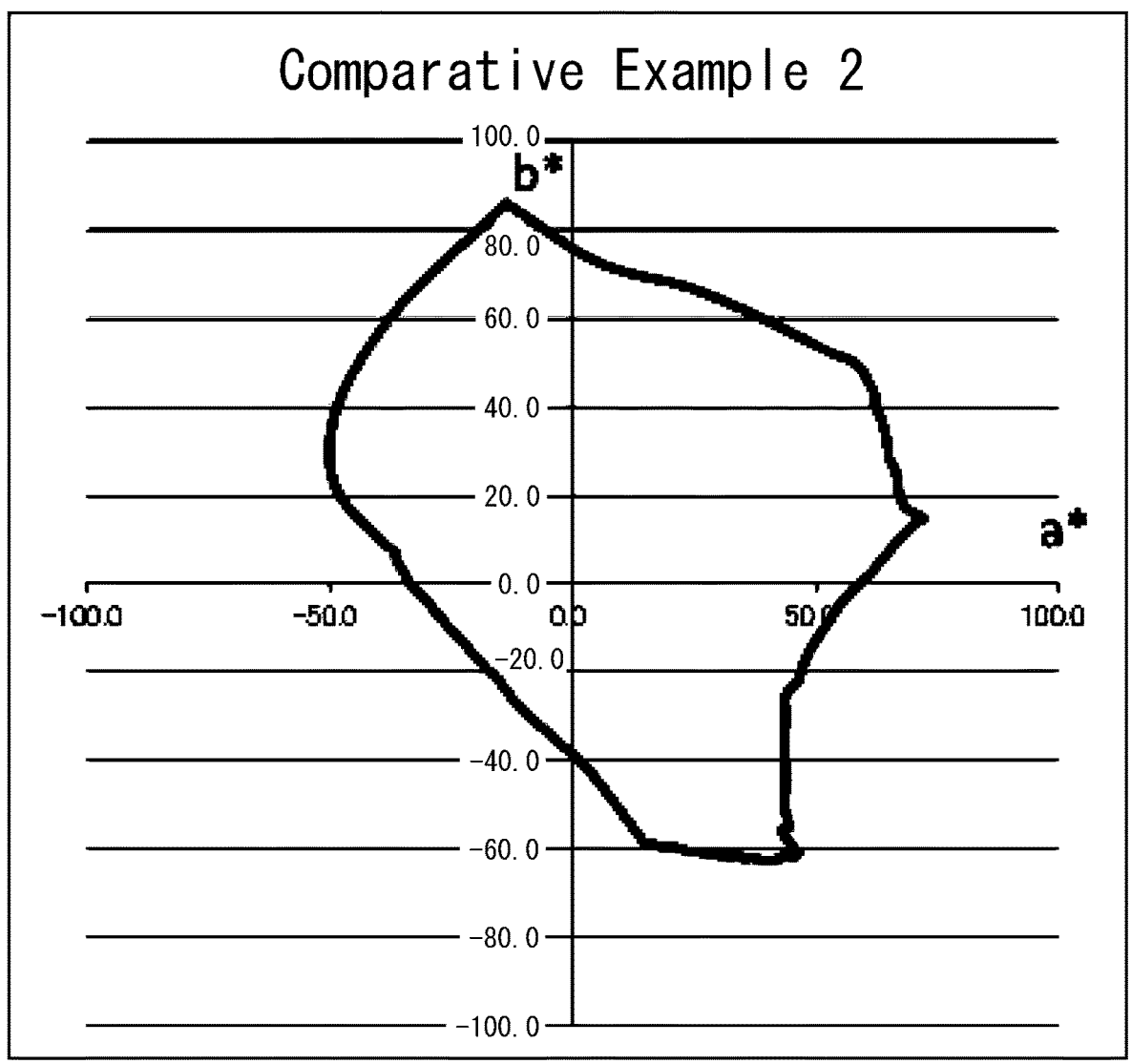
Figure 2:
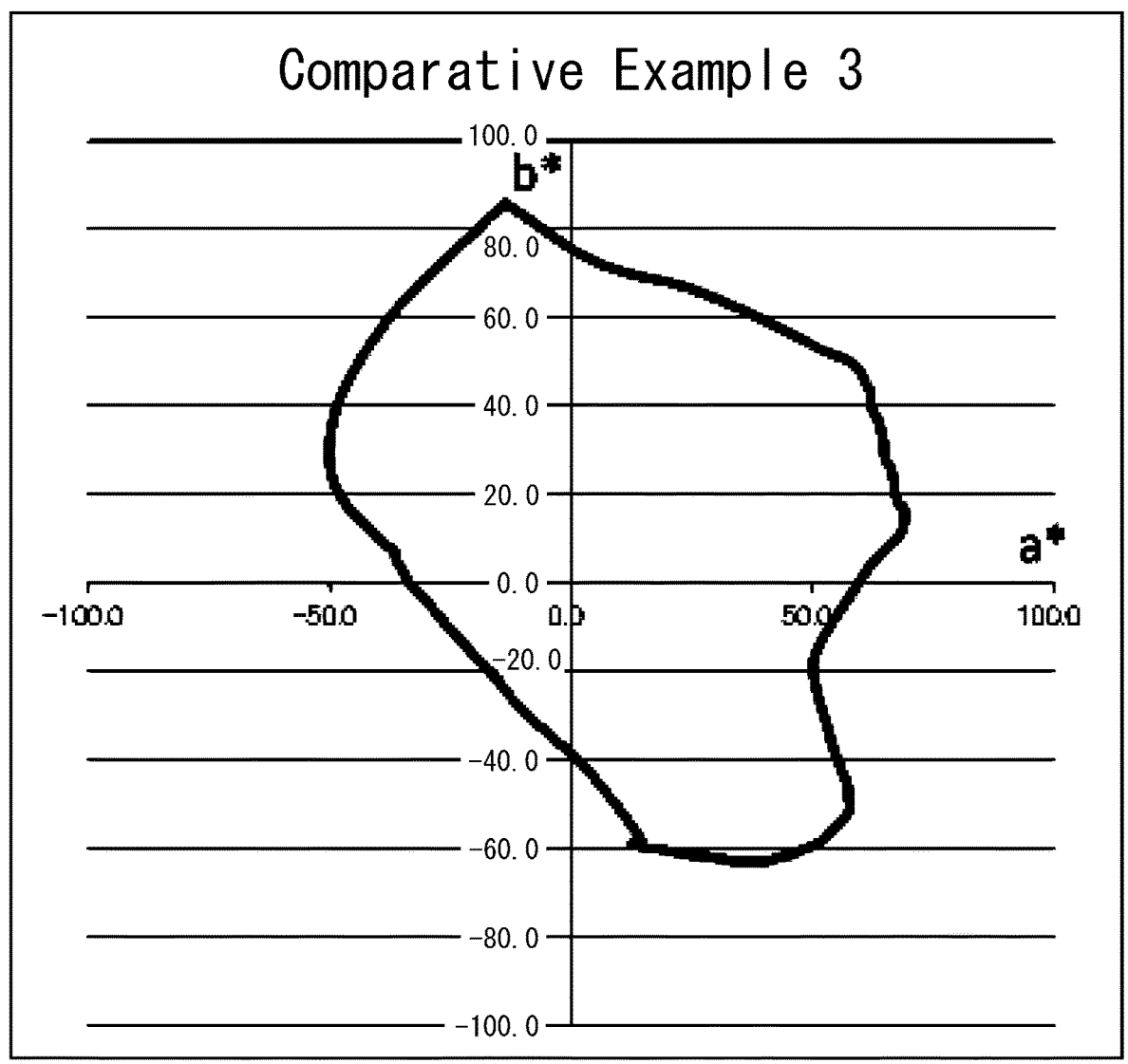

The dyed portion of each dyed product obtained in Examples and Comparative Examples above was subjected to colorimetry using a spectrophotometer "eXact (produced by X-Rite, Inc.)" to find a*b*. The colorimetry was performed under the conditions of a D65 light source, a viewing angle of 2°, and the status I. The results obtained are plotted on the a*b* coordinate, and the plots are connected by straight lines as given in FIG. 1 and FIG. 2. A larger the circle formed by the connected straight lines indicates that the reproducible color gamut or the color gamut is larger.

Figure 3:
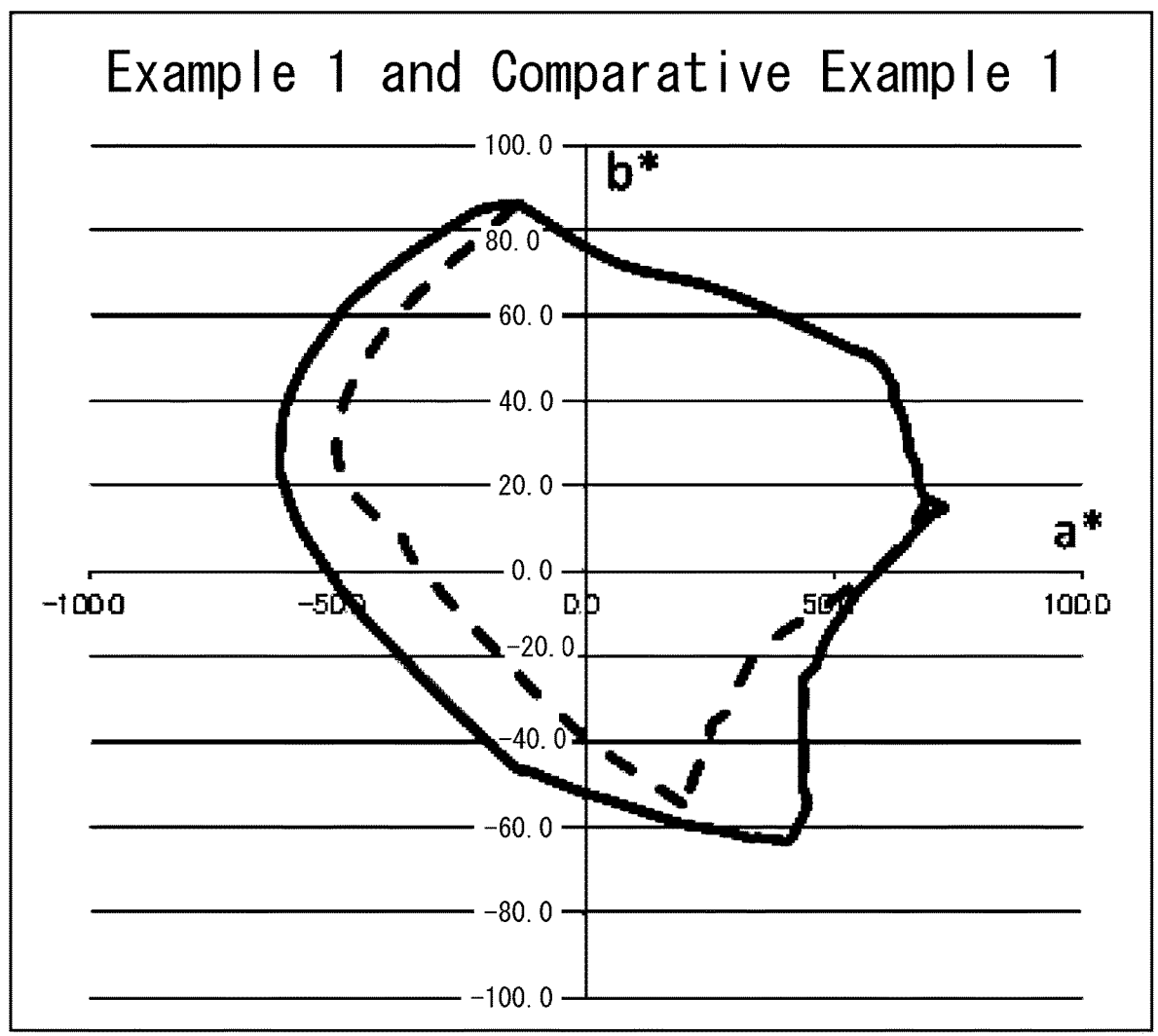
FIG. 3 shows diagrams in which the data of Examples in FIG. 1 and the data of Comparative Example 1 in FIG. 2 are overlaid, and the data for Examples are indicated by solid lines and the data for Comparative Example 1 are indicated by broken lines.
Figure 3:
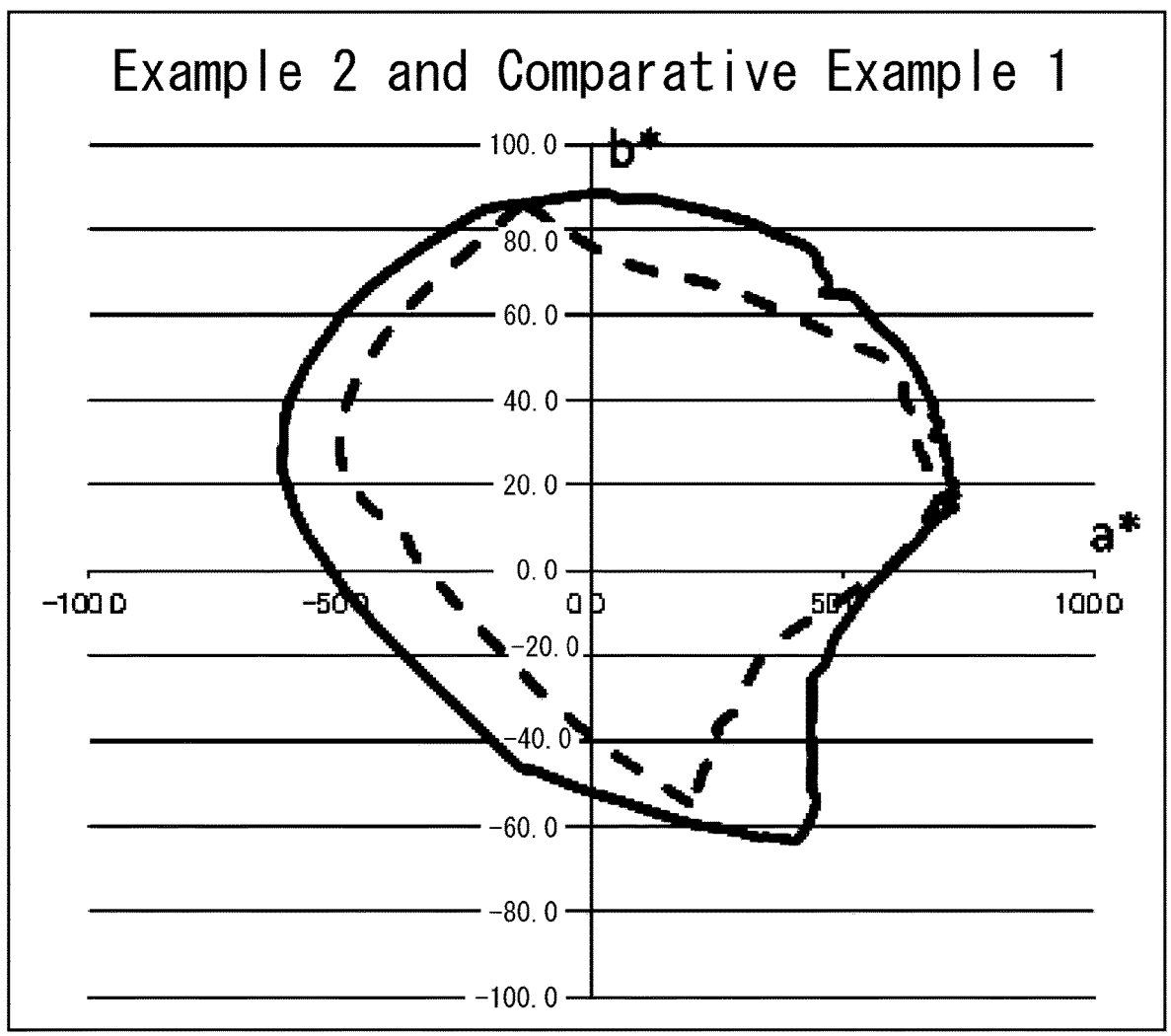
Figure 3:
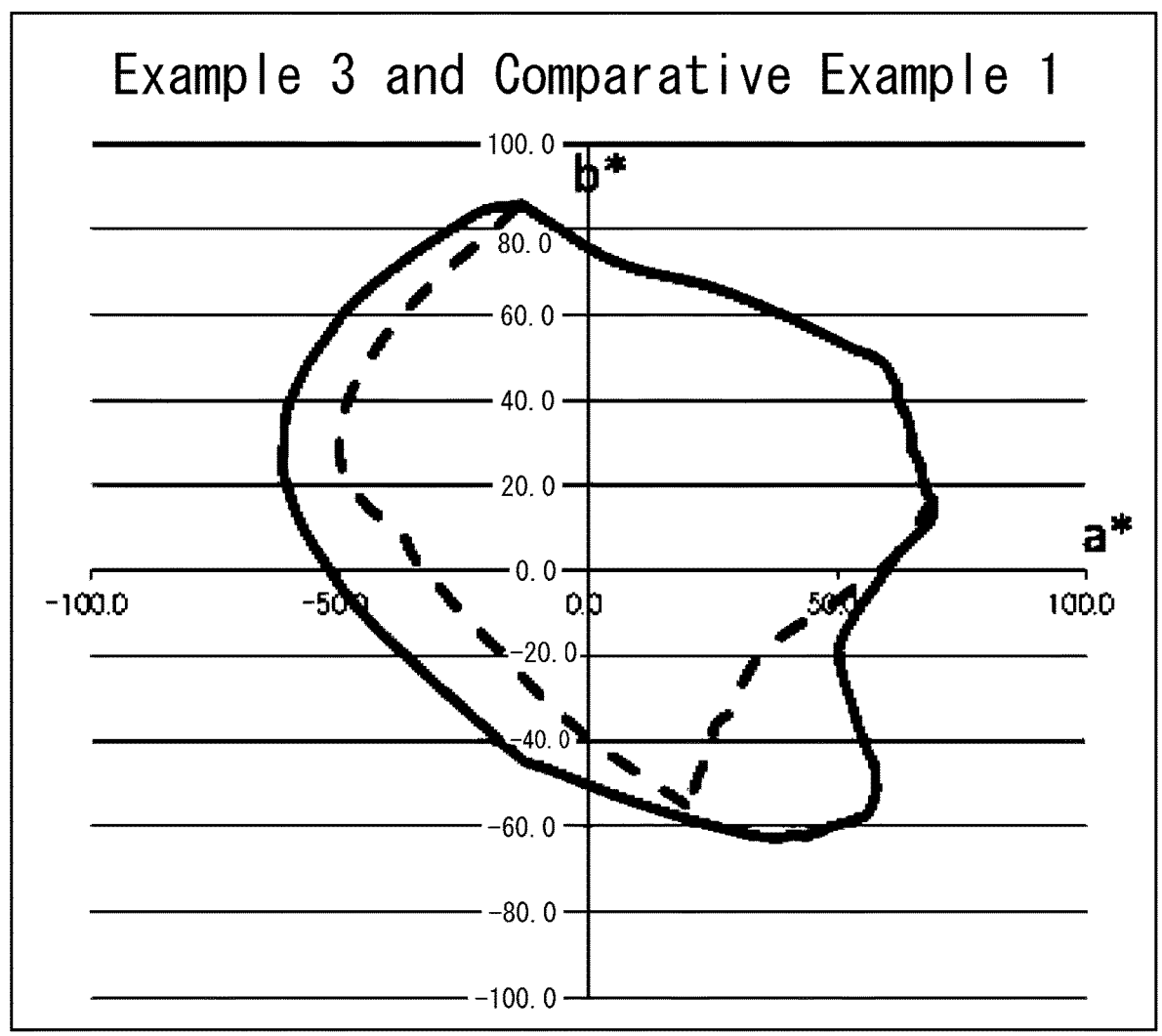
Figure 3:
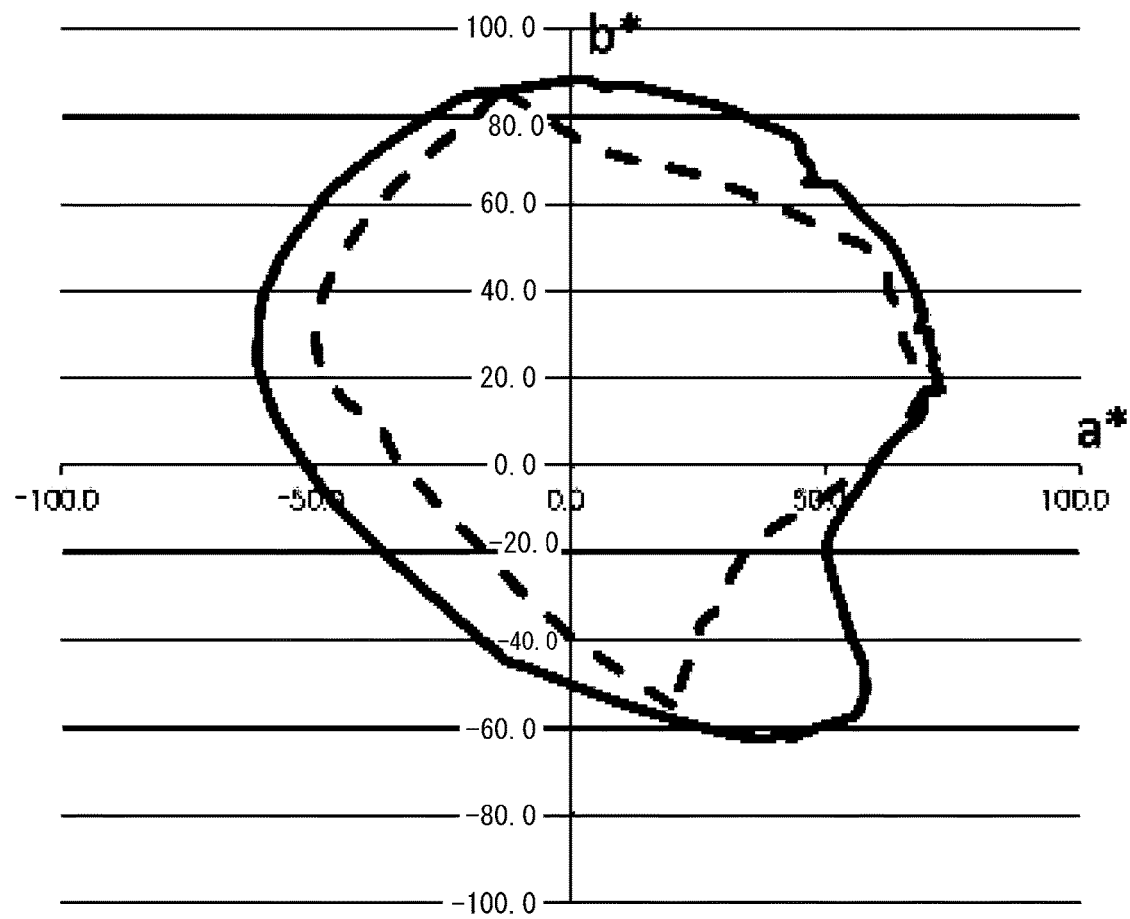
Figure 3:
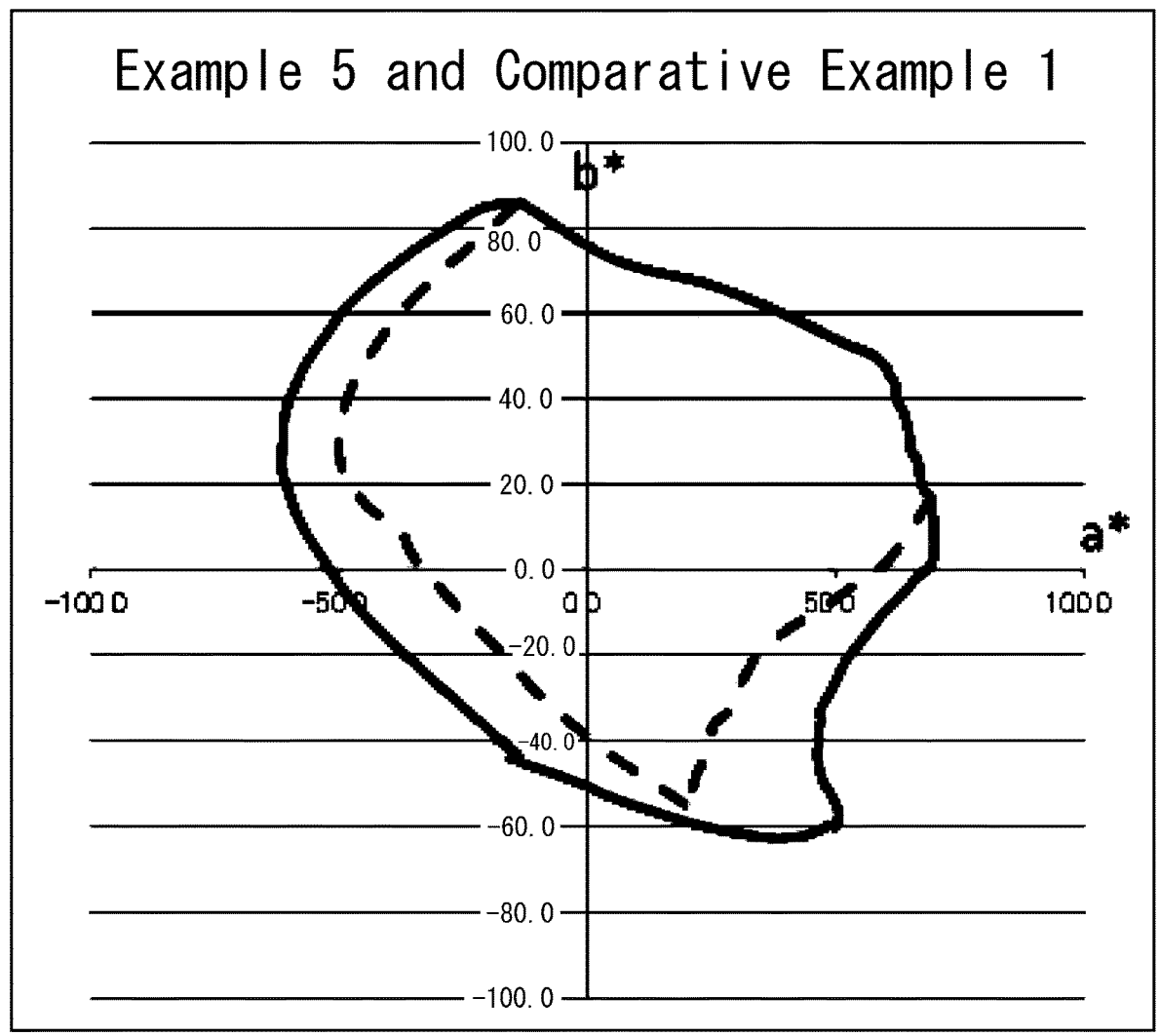
Figure 3:
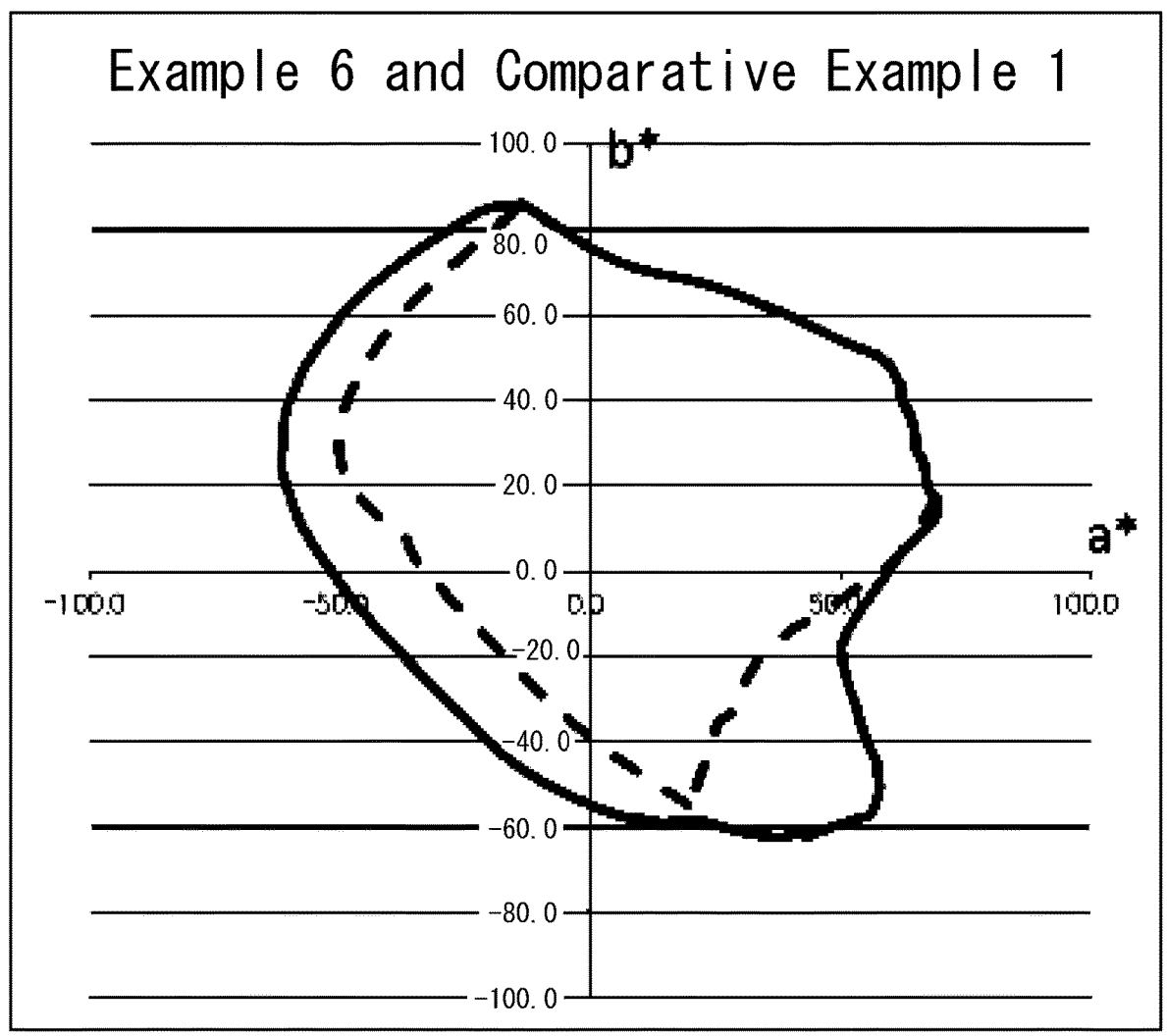
Figure 3:
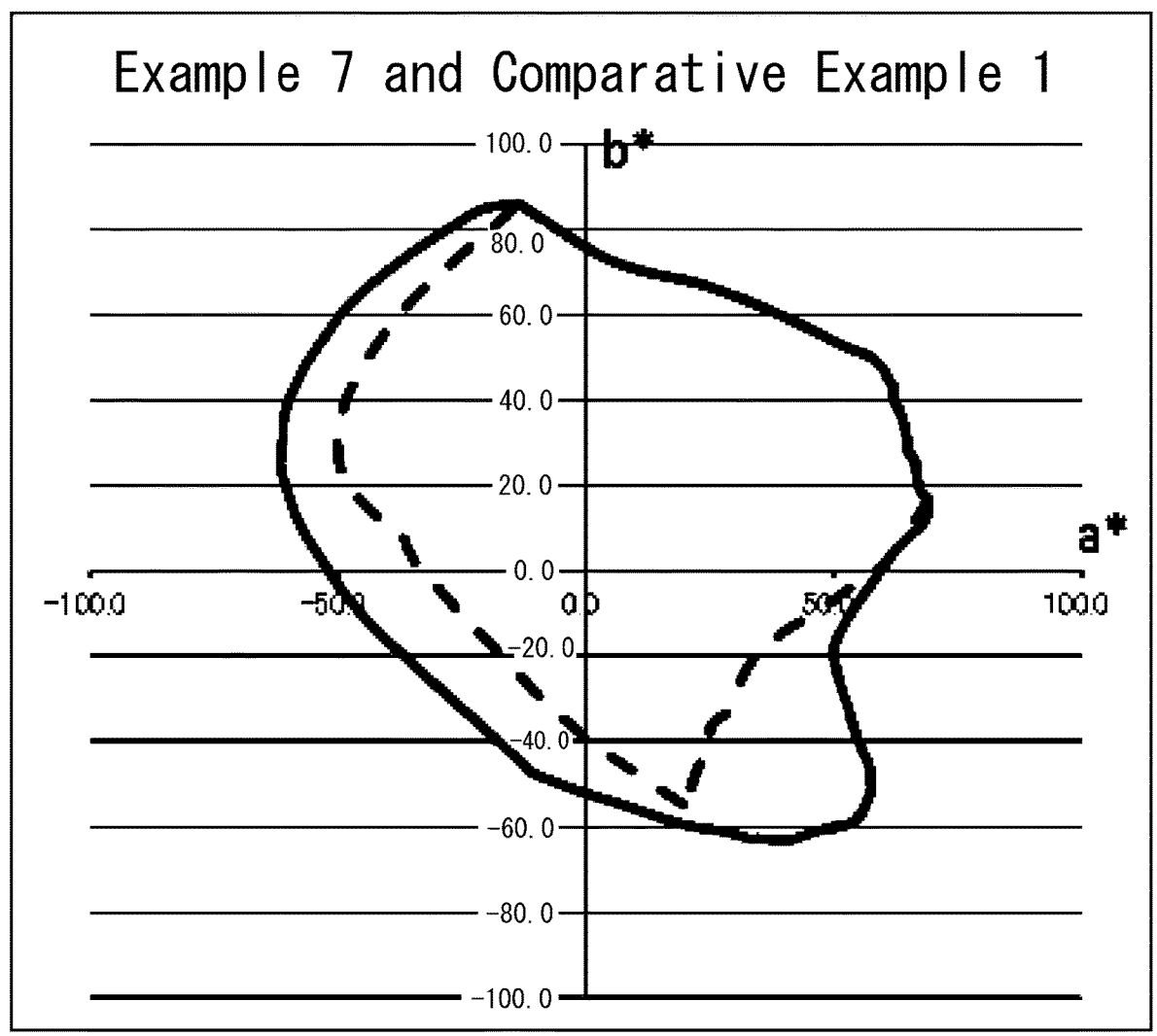

FIG. 3 demonstrates that the area bounded by the lines connecting the data is larger in Examples 1 to 7, as compared with Comparative Example 1, thus the color gamut was increased.

Figure 4:
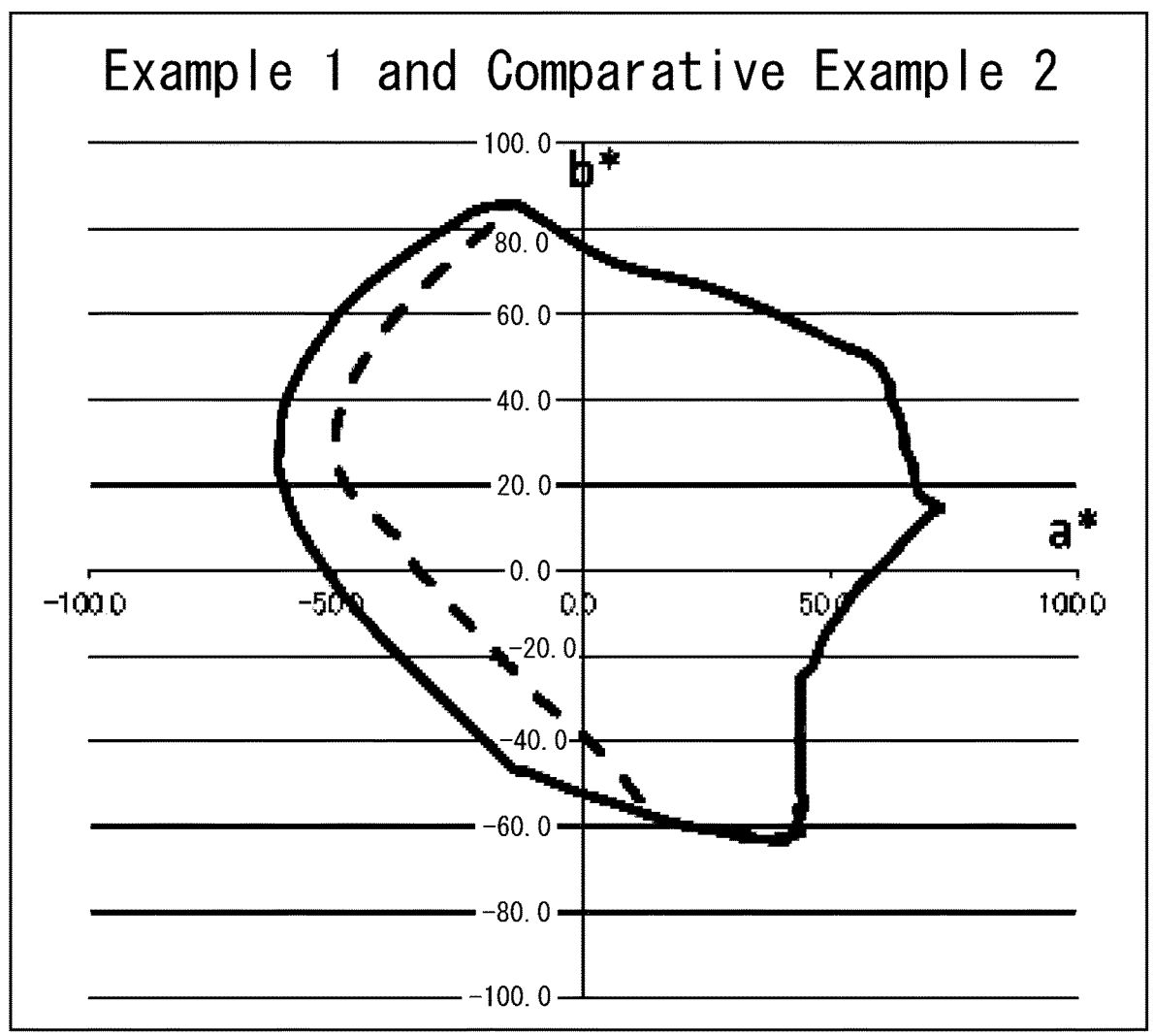
FIG. 4 shows diagrams in which the data of Examples in FIG. 1 and the data of Comparative Example 2 in FIG. 2 are overlaid, and the data for Examples are indicated by solid lines and the data for Comparative Example 2 are indicated by broken lines.
Figure 4:
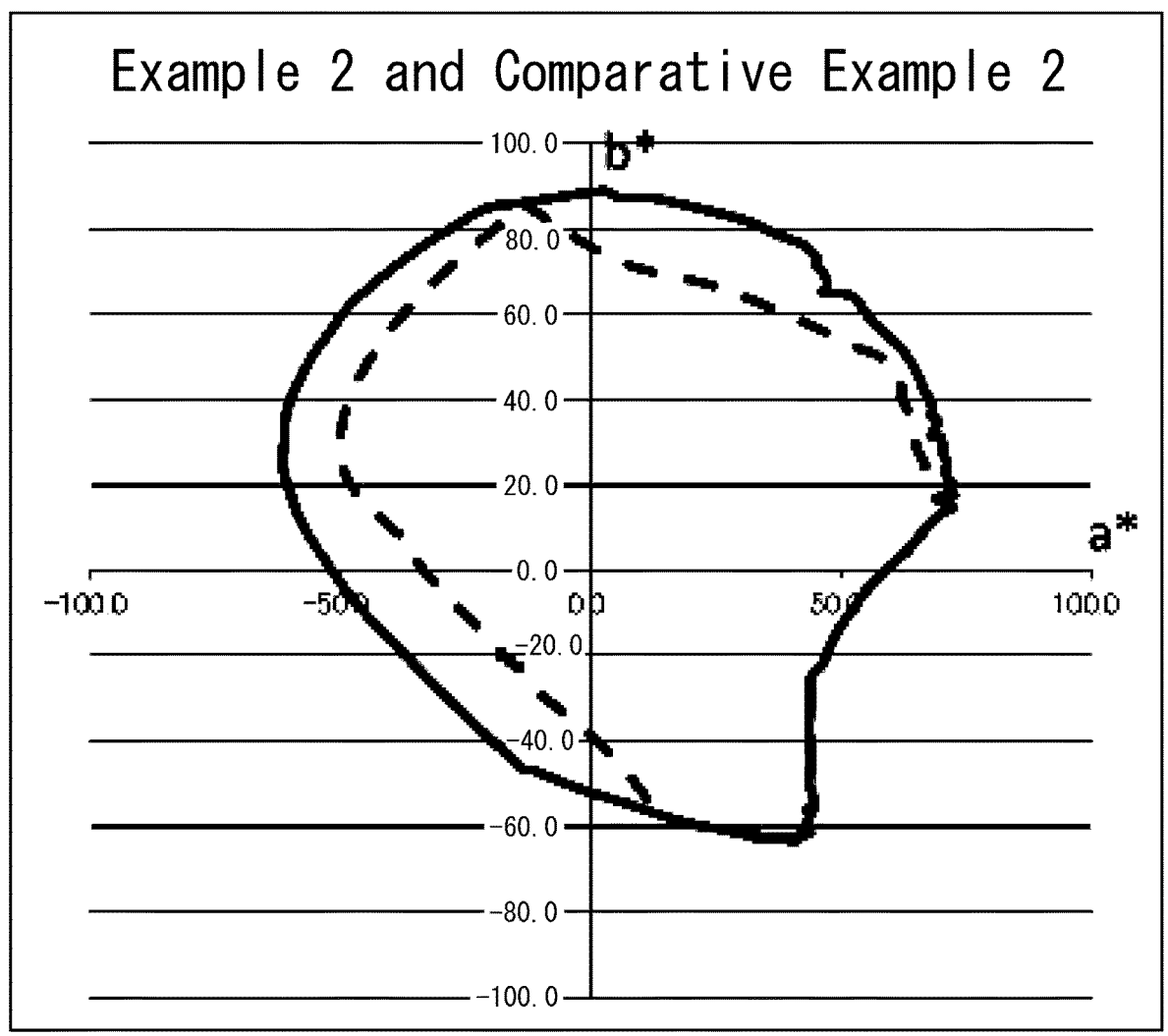
Figure 4:
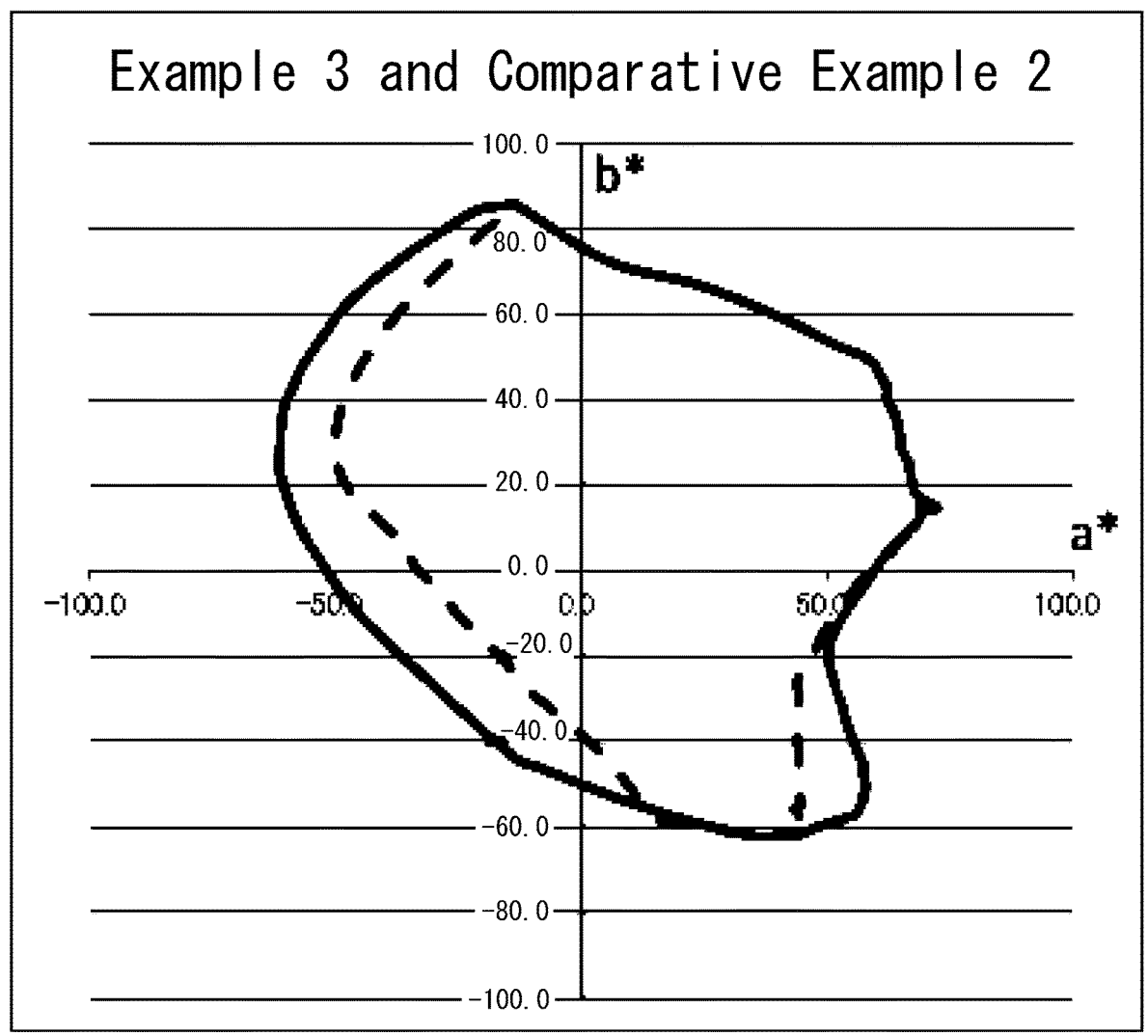
Figure 4:
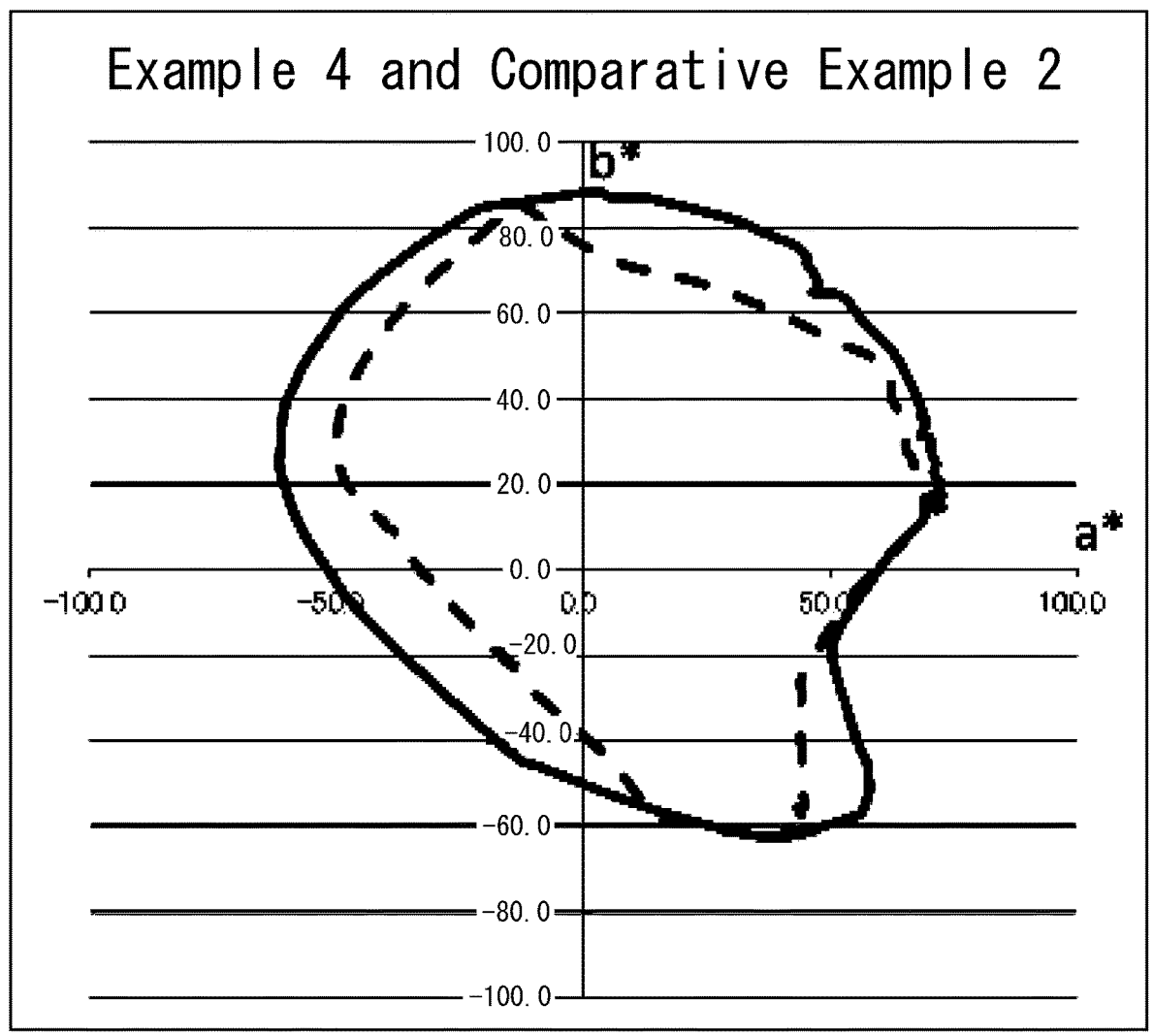
Figure 4:
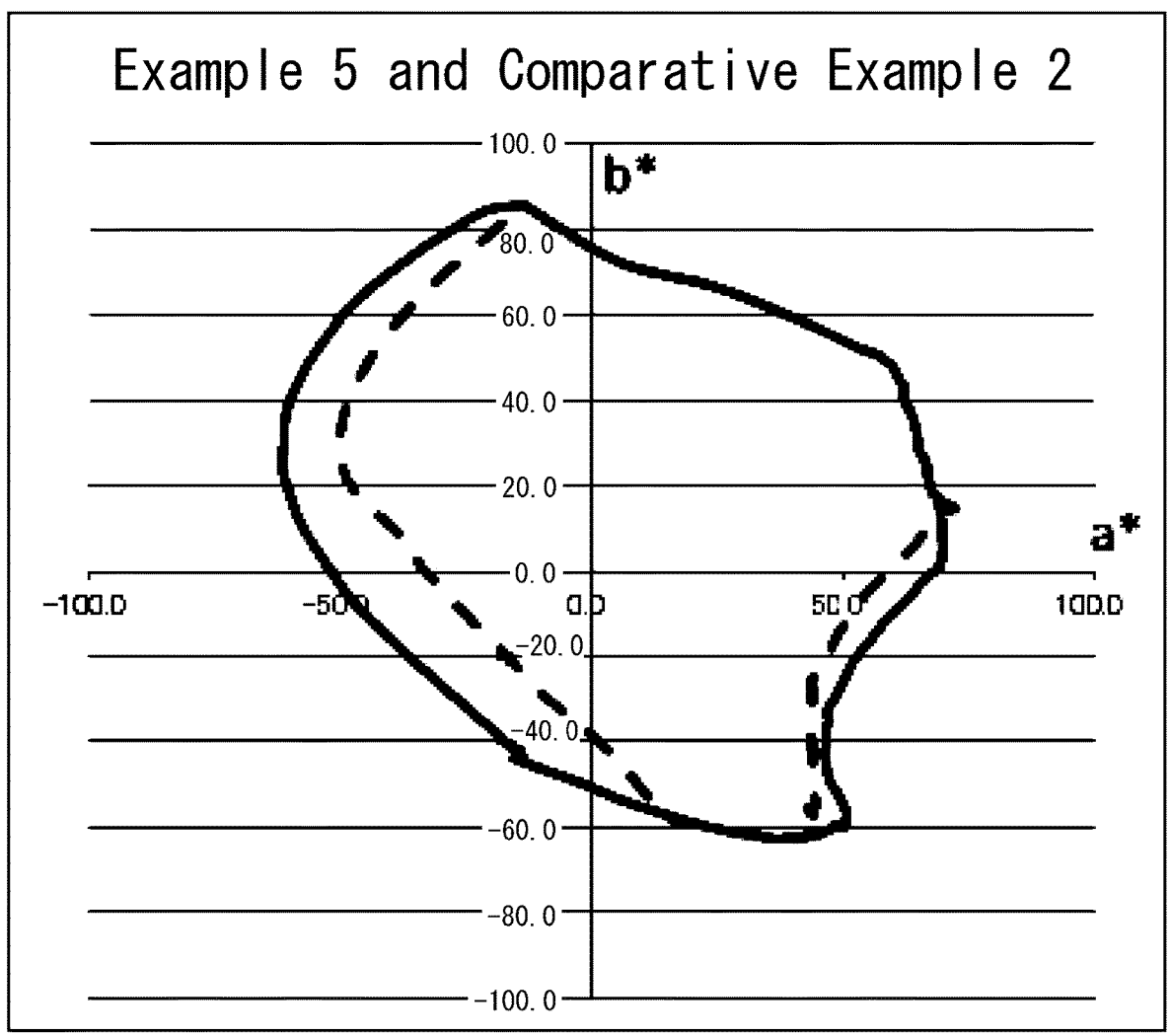
Figure 4:
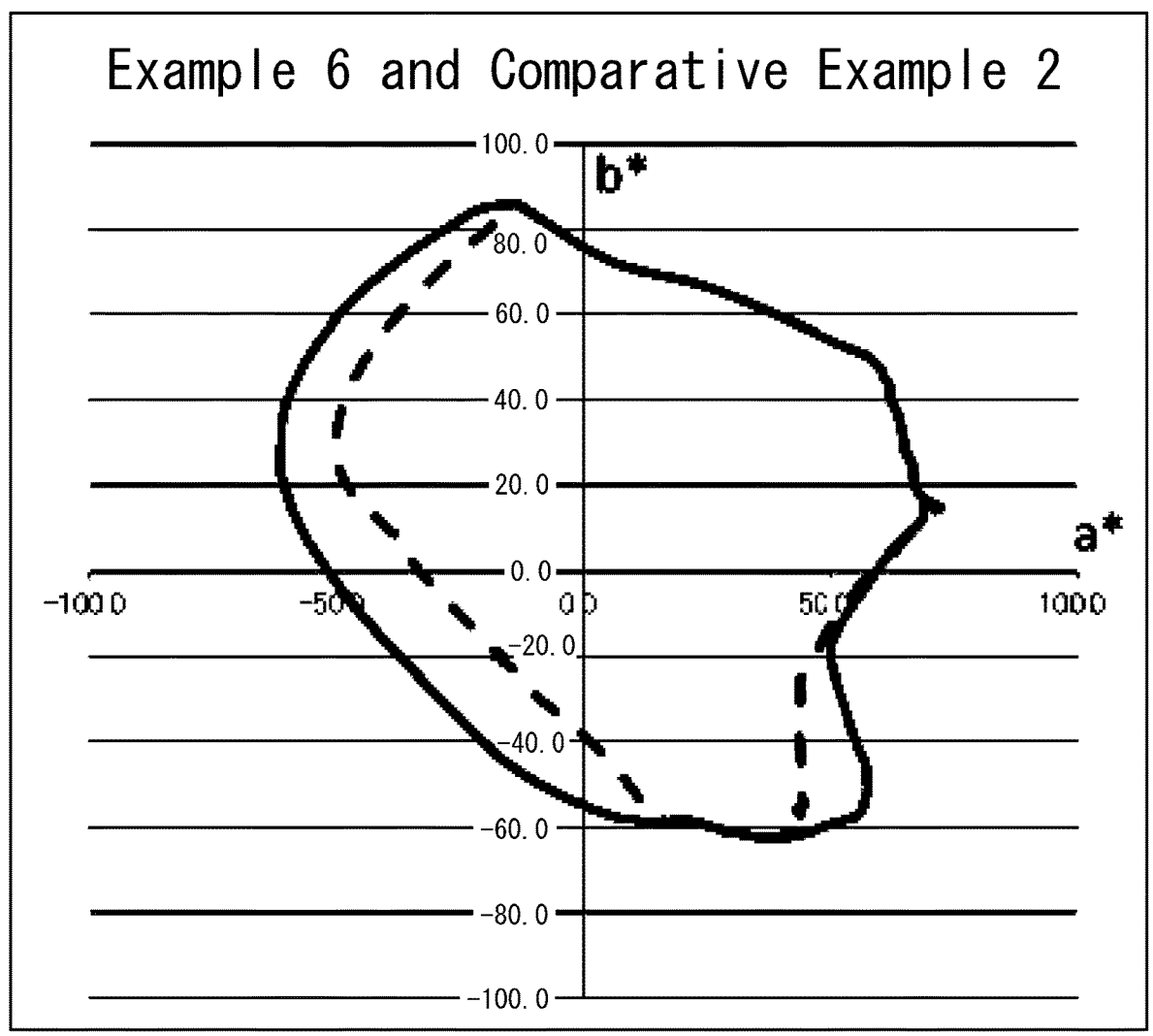
Figure 4:
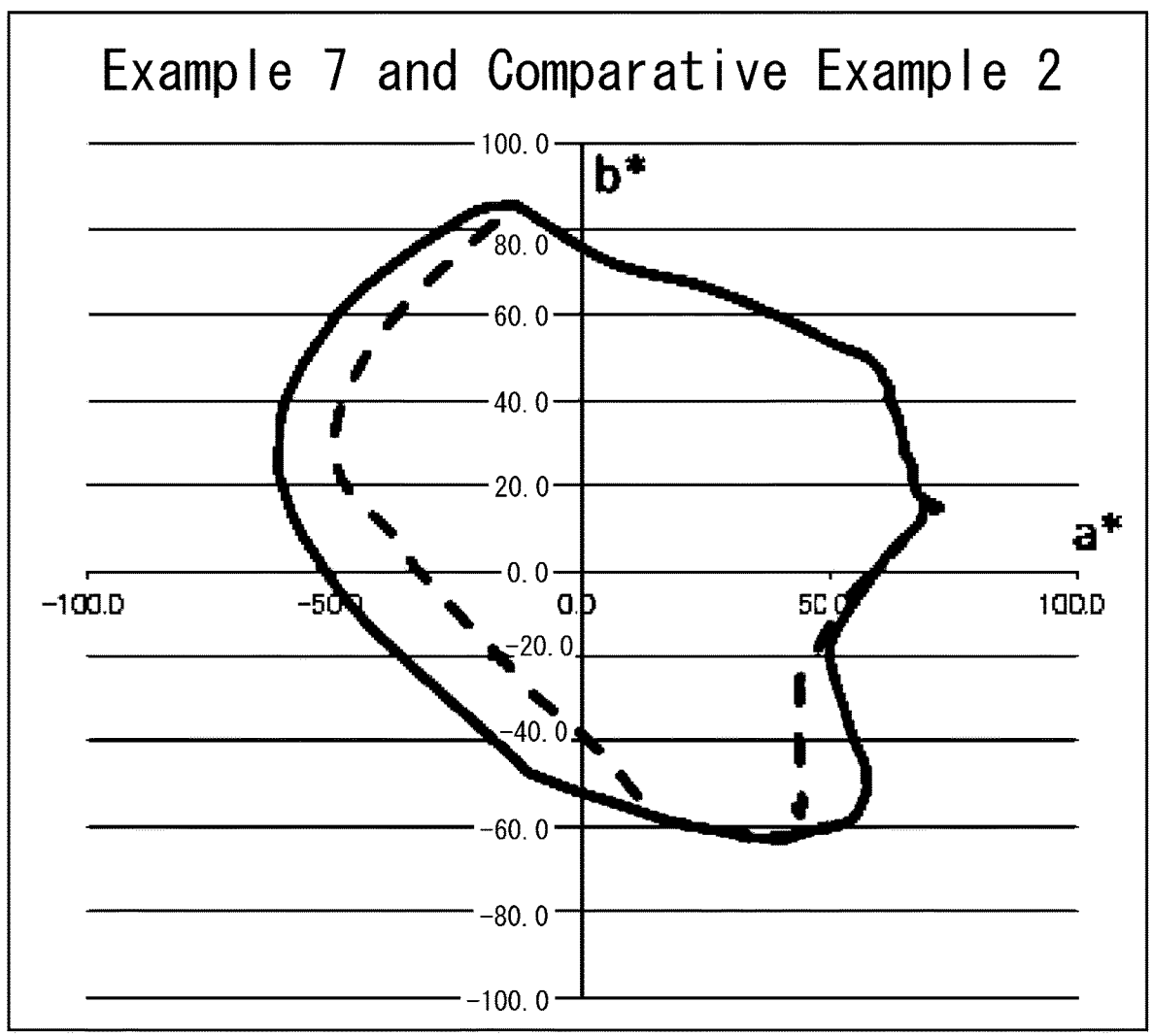

FIG. 4 demonstrates that the area bounded by the lines connecting the data is larger in Examples 1 to 7, as compared with Comparative Example 2, thus the color gamut was increased.

Figure 5:
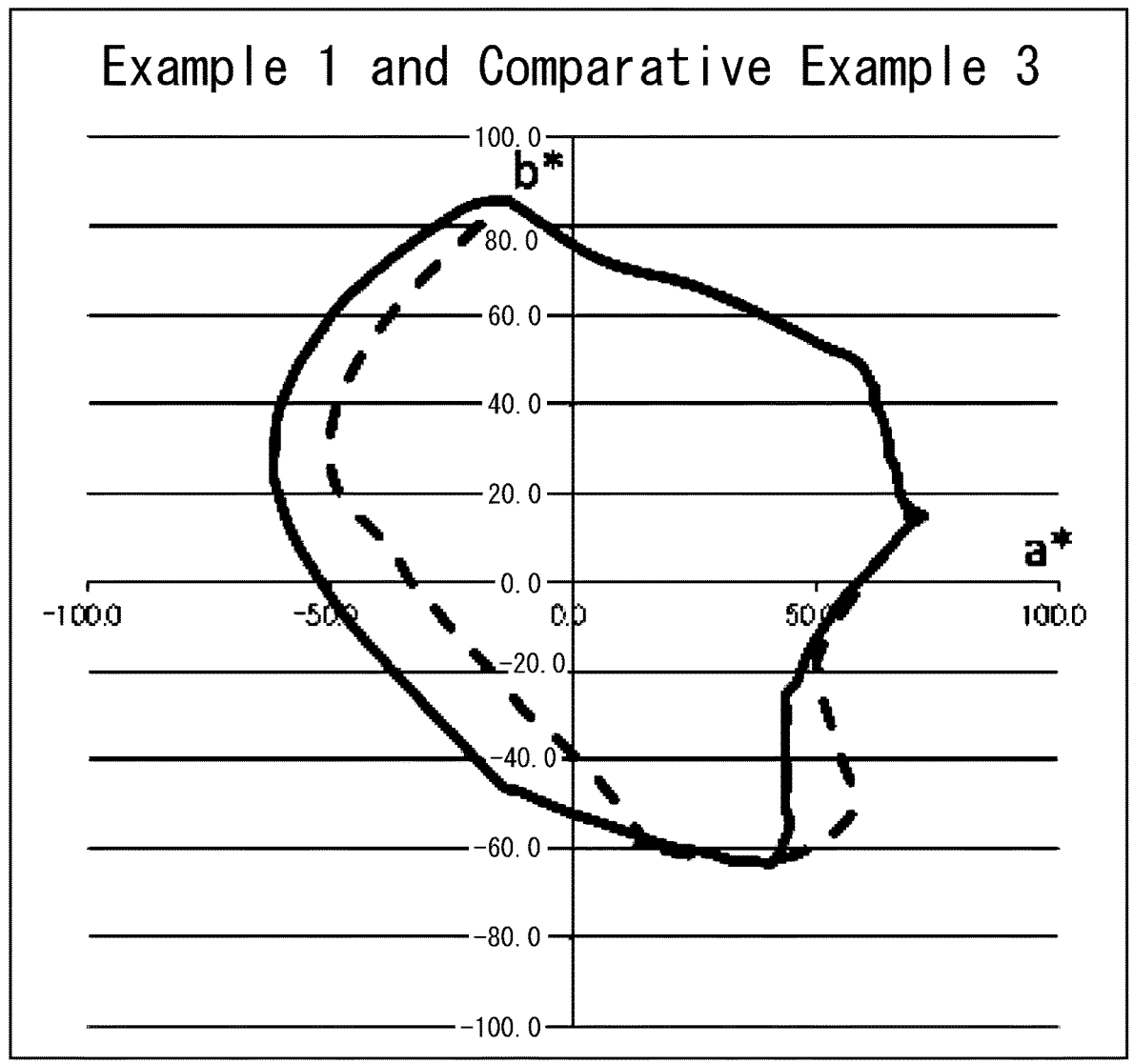
FIG. 5 shows diagrams in which the data of Examples in FIG. 1 and the data of Comparative Example 3 in FIG. 2 are overlaid, and the data for Examples are indicated by solid lines and the data for Comparative Example 3 are indicated by broken lines.
Figure 5:
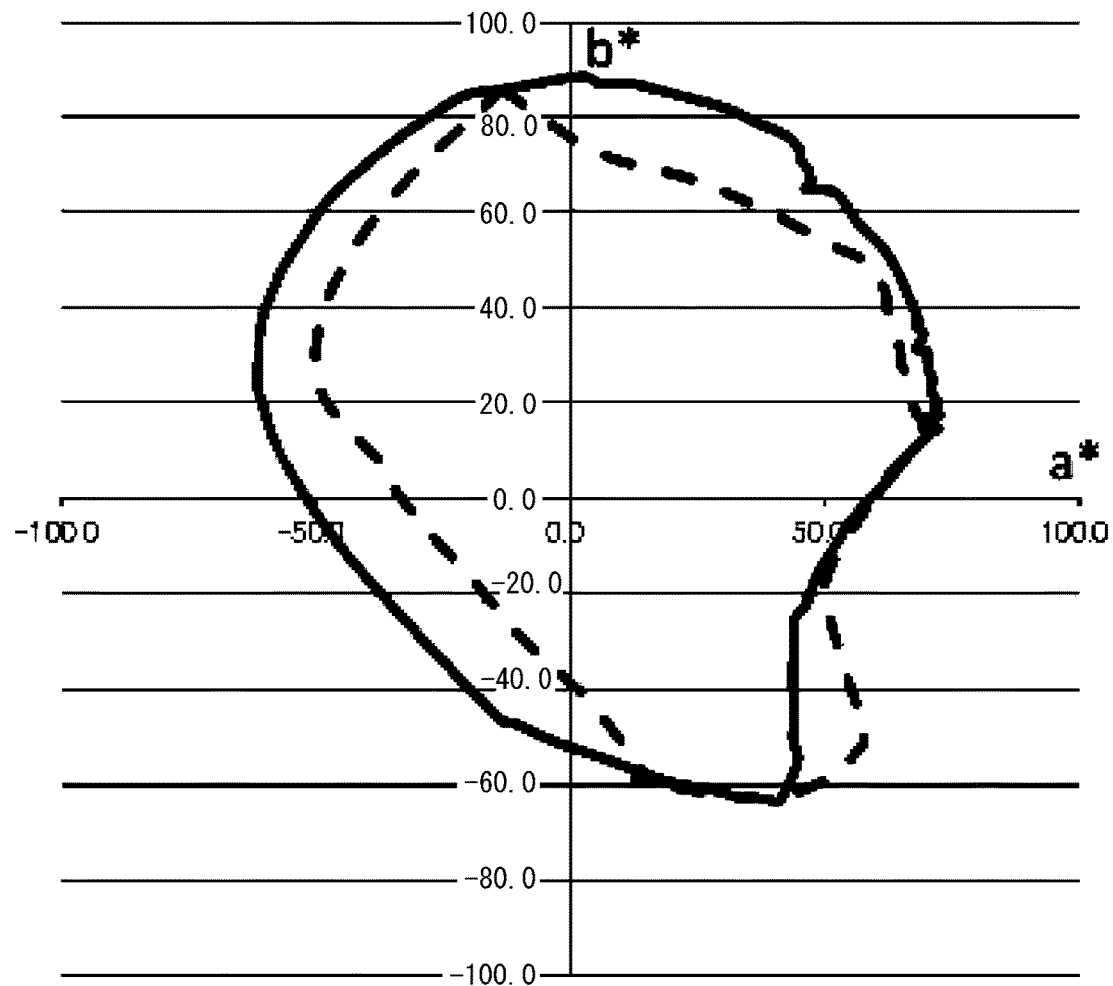
Figure 5:
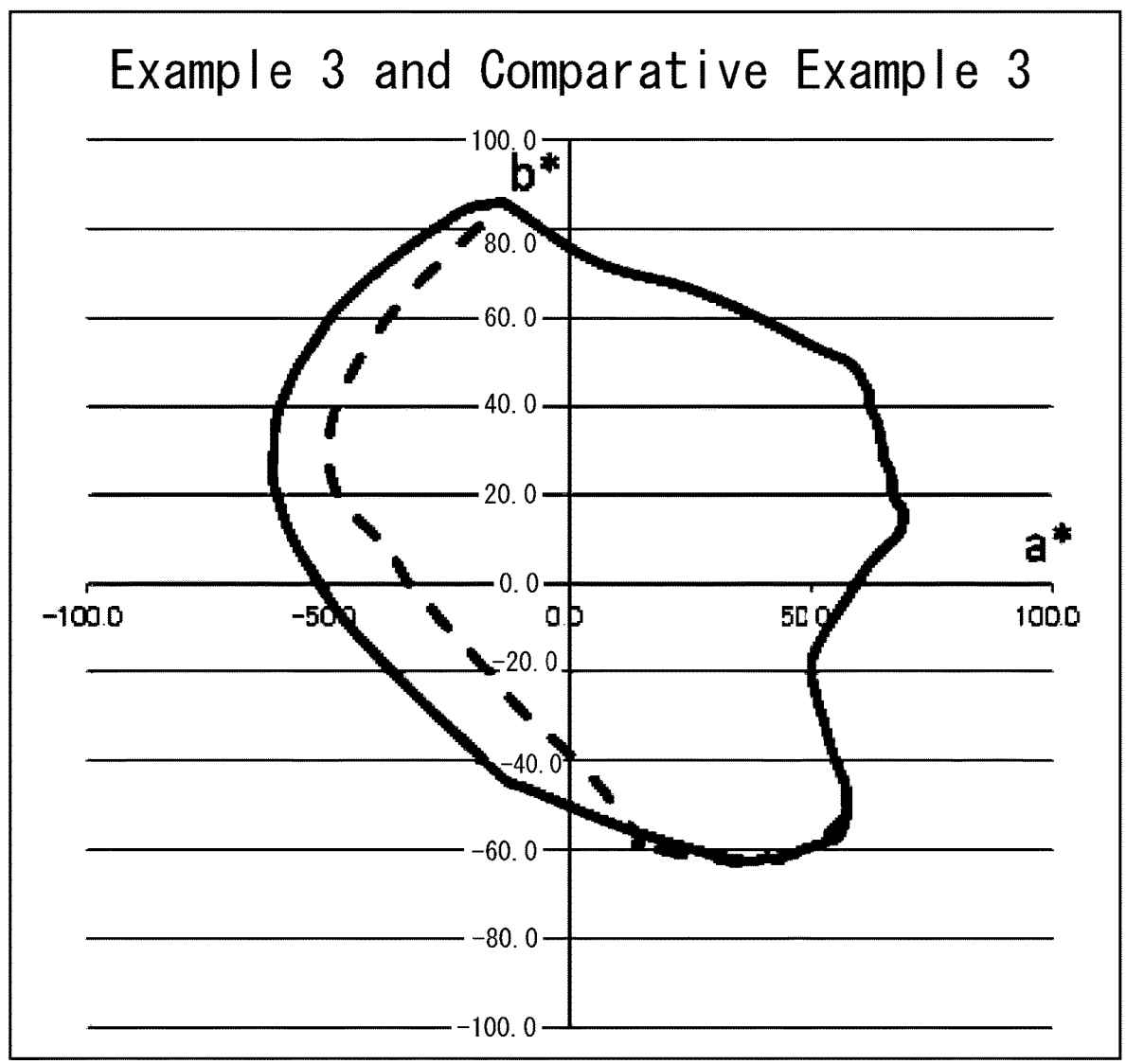
Figure 5:
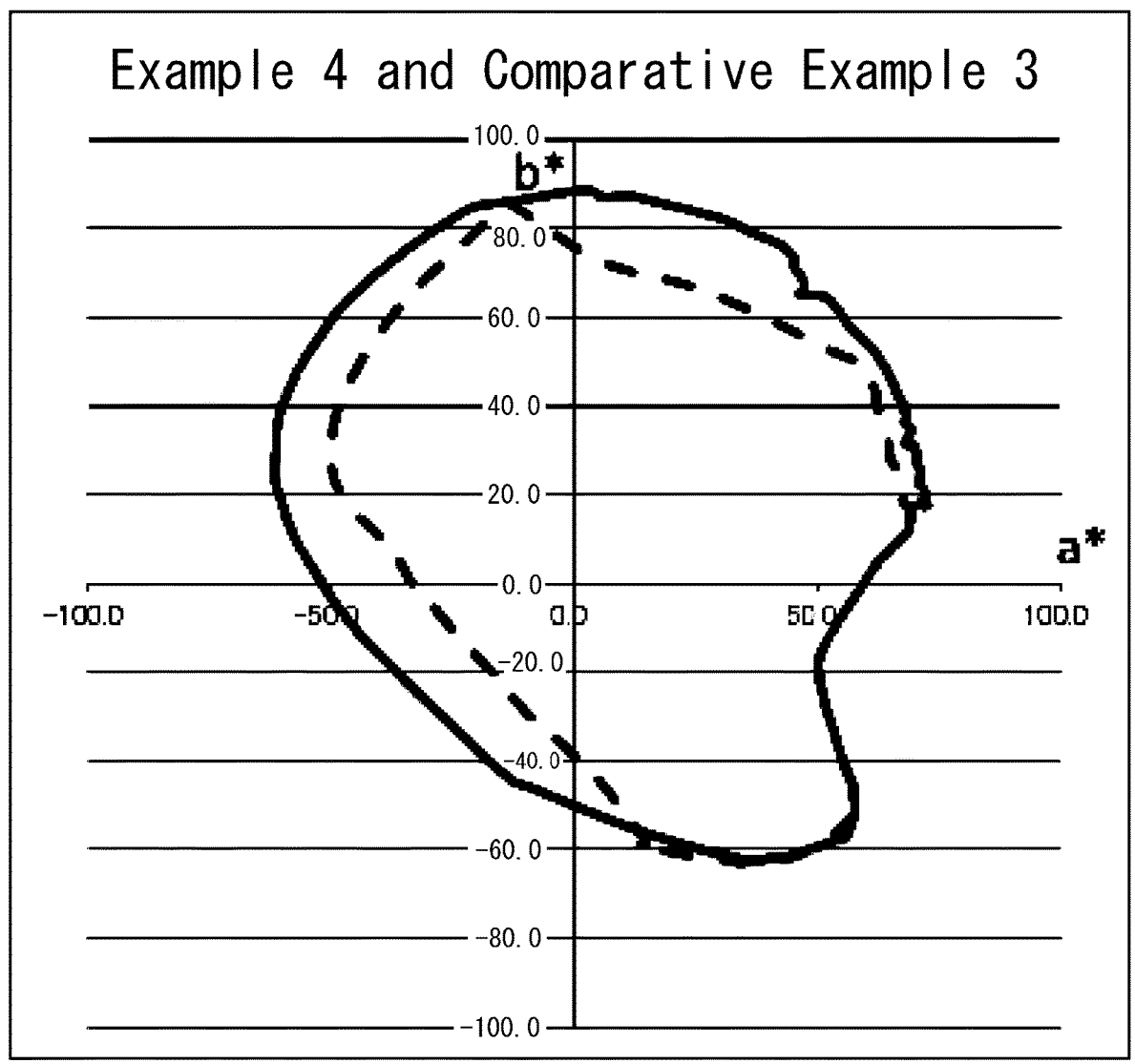
Figure 5:
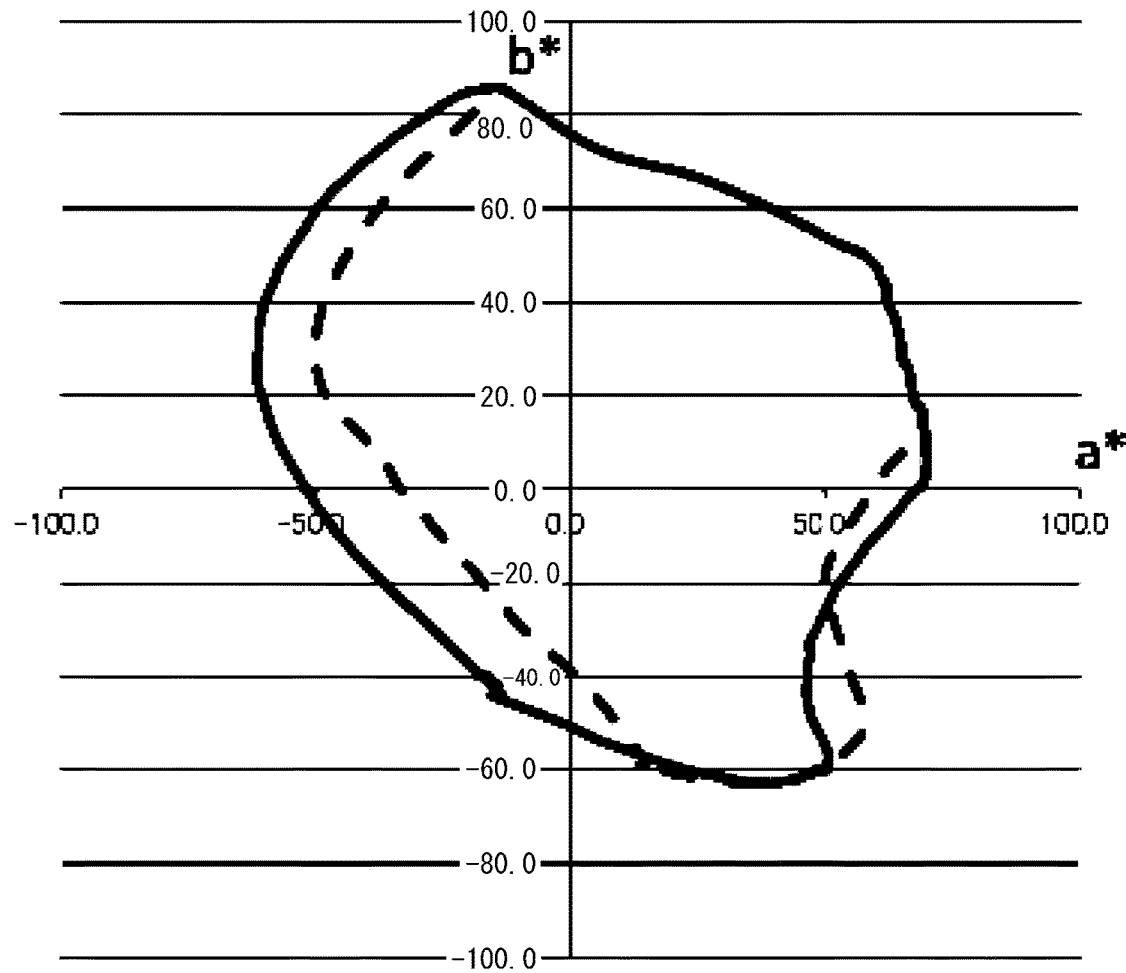
Figure 5:
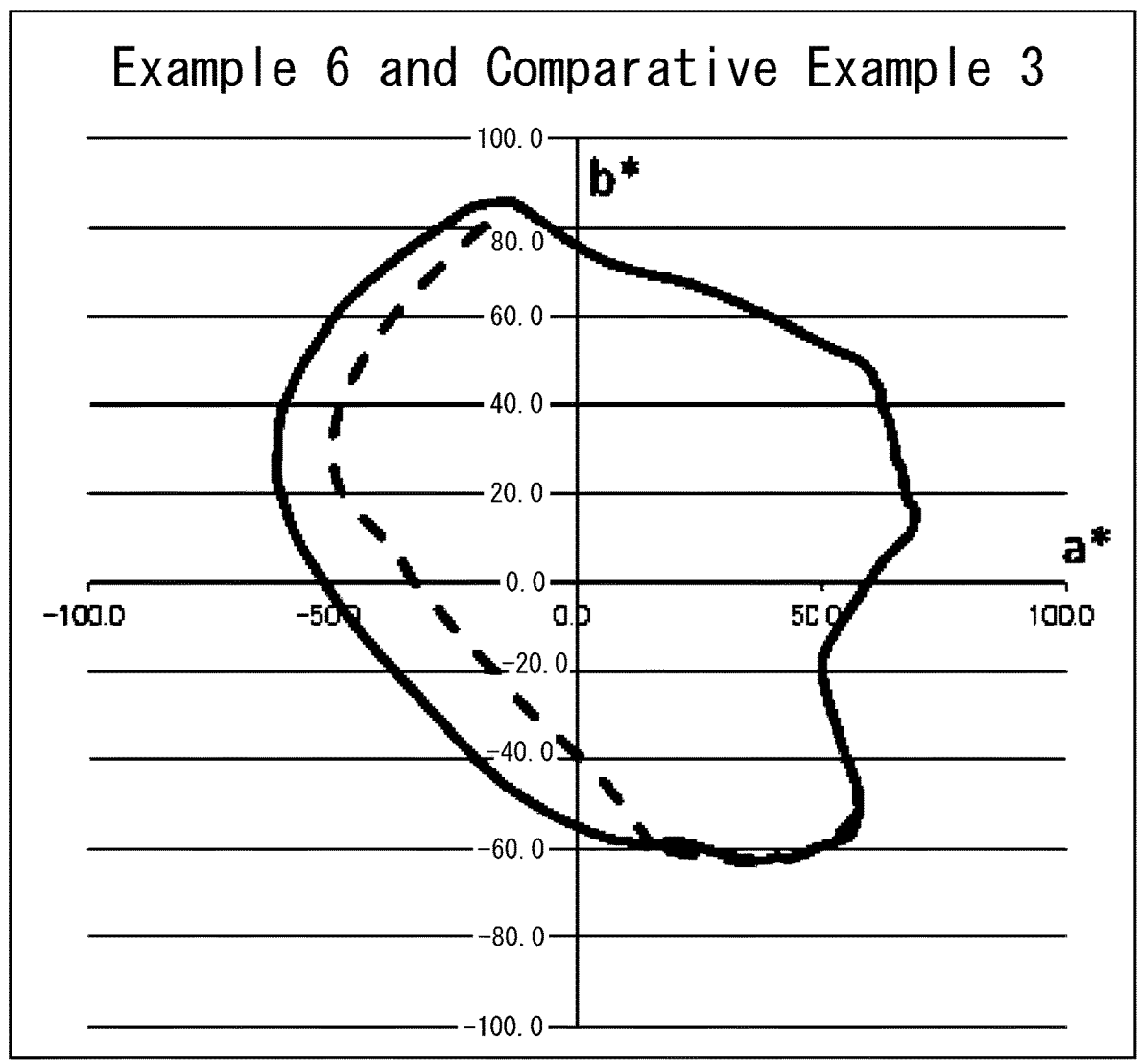
Figure 5:
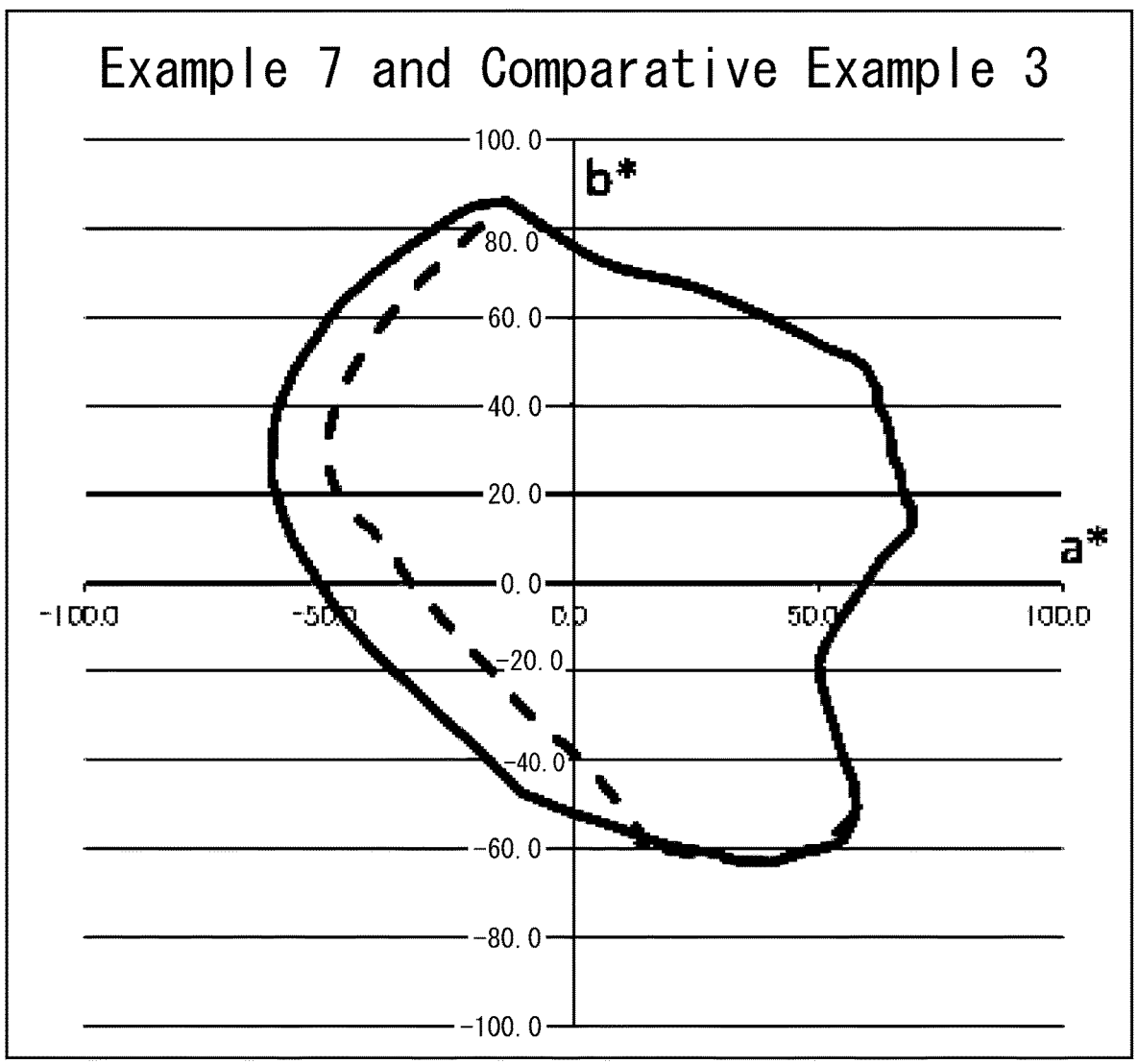

FIG. 5 demonstrates that the area bounded by the lines connecting the data is larger in Examples 1 to 7, as compared with Comparative Example 3, thus the color gamut was increased.

As is more apparent from FIG. 3 to FIG. 5, the ink sets of Examples were found to have an expanded color gamut in the turquoise area, the violet area, the green area, the orange area, and even in the blue area. Further, the blue area can be covered without the use of the water-based ink 4 used in Comparative Examples.

INDUSTRIAL APPLICABILITY

The ink sets according to the present disclosure provide an expanded color gamut. Accordingly, these ink sets are significantly useful as ink sets used in dying base materials, preferably fiber, more preferably polyester fiber, or mixed fibers containing polyester fiber.

The invention claimed is:

1. An ink set comprising a cyan ink and a violet ink to be applied to a recording medium respectively, wherein the cyan ink and the violet ink each contain a water-insoluble colorant and water, and further comprising at least one yellow ink and at least one magenta ink to be applied to the recording medium respectively, wherein the cyan ink contains at least a compound represented by formula (1) as the water-insoluble colorant, the violet ink contains at least one selected from the group consisting of C.I. Disperse Violet 27 and C.I. Disperse Violet 28 as the water-insoluble colorant, the yellow ink contains at least C.I. Disperse Yellow 54, and the magenta ink contains at least C.I. Disperse Red 60,

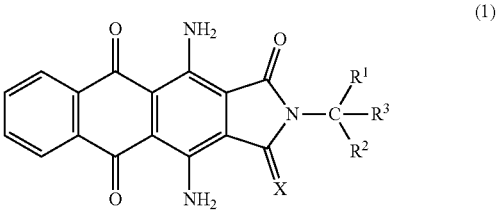

where $R^1$, $R^2$, and $R^3$ each independently represents one of a hydrogen atom and a C1-C4 alkyl group; at least two of $R^1$, $R^2$, and $R^3$ are C1-C4 alkyl groups; a number of carbon atoms in $R^1$, $R^2$, and $R^3$ is 4 to 12 in total; and X represents one of an oxygen atom and an imino group.

2. The ink set according to claim 1, further comprising at least one second cyan ink.

3. The ink set according to claim 2, wherein the second cyan ink contains at least C.I. Disperse Blue 359.

4. The ink set according to claim 1, further comprising at least one orange ink.

5. The ink set according to claim 4, wherein the orange ink contains at least C.I. Disperse Orange 25.

6. The ink set according to claim 1, wherein any two of $R^1$, $R^2$, and $R^3$ in formula (1) are C1-C4 alkyl groups, and the other one is a hydrogen atom.

7. The ink set according to claim 1, wherein any two of $R^1$, $R^2$, and $R^3$ in formula (1) are ethyl groups, and the other one is a hydrogen atom.

8. A fiber on which textile printing has been performed using the ink set according to claim 1.

9. A method of textile printing on a hydrophobic fiber, comprising:
a step A of applying ink droplets to the hydrophobic fiber with an inkjet printer using the ink set according to claim 1;
a step B of fixing the colorant in the ink droplets applied in the step A to the fiber by heat; and
a step C of washing off part of the colorant left unfixed in the fiber.

10. A method of textile printing on a hydrophobic fiber, comprising: applying ink droplets to an intermediate recording medium with an inkjet printer using the ink set according to claim 1 to obtain a recorded image; and then bringing the hydrophobic fiber into contact with a surface of the intermediate recording medium to which the ink droplets have been applied, followed by heat treatment, whereby transferring the recorded image to the hydrophobic fiber.

11. The method of textile printing on a hydrophobic fiber, according to claim 9, further comprising a fiber pretreatment step of adding an aqueous solution containing at least one or more sizing agents, an alkaline substance, an anti-reducing agent, and a hydrotropic agent to the fiber to be subjected to the application of the inks.

12. The method of textile printing on a hydrophobic fiber, according to claim 10, further comprising a fiber pretreatment step of adding an aqueous solution containing at least one or more sizing agents, an alkaline substance, an anti-reducing agent, and a hydrotropic agent to the fiber to be subjected to the application of the inks.

\* \* \* \* \*